United States Patent
Youn

(10) Patent No.: US 12,470,255 B2
(45) Date of Patent: Nov. 11, 2025

(54) METHOD AND DEVICE FOR PROVIDING COMPATIBILITY WITH MPP IN WIRELESS POWER TRANSMISSION SYSTEM

(71) Applicant: LG Electronics Inc., Seoul (KR)

(72) Inventor: Jinho Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 18/577,039

(22) PCT Filed: Jul. 1, 2022

(86) PCT No.: PCT/KR2022/009505
§ 371 (c)(1),
(2) Date: Jan. 5, 2024

(87) PCT Pub. No.: WO2023/282548
PCT Pub. Date: Jan. 12, 2023

(65) Prior Publication Data
US 2024/0313826 A1    Sep. 19, 2024

(30) Foreign Application Priority Data
Jul. 5, 2021  (KR) .................. 10-2021-0088001

(51) Int. Cl.
*H04B 5/79* (2024.01)
*H02J 50/12* (2016.01)
*H04B 5/26* (2024.01)

(52) U.S. Cl.
CPC ............. *H04B 5/79* (2024.01); *H02J 50/12* (2016.02); *H04B 5/26* (2024.01)

(58) Field of Classification Search
CPC .... H04B 5/79; H04B 5/26; H02J 50/12; H02J 7/00034; H02J 7/00045; H02J 50/80;
(Continued)

(56) References Cited

U.S. PATENT DOCUMENTS

| | | | |
|---|---|---|---|
| 8,140,054 B2 * | 3/2012 | Park ................. | H04L 69/24 455/410 |
| 2009/0271048 A1 * | 10/2009 | Wakamatsu .......... | H02J 50/12 700/296 |

(Continued)

FOREIGN PATENT DOCUMENTS

| CN | 108092421 A | * | 5/2018 | ............. H02J 50/80 |
|---|---|---|---|---|
| CN | 108092421 A1 | | 5/2018 | |
| WO | WO-2019172535 A1 | * | 9/2019 | ............... H02J 7/02 |

OTHER PUBLICATIONS

Extended European Search Report in European Appln. No. 22837900.4, mailed on Aug. 27, 2024, 130 pages.

*Primary Examiner* — Rexford N Barnie
*Assistant Examiner* — Michael J Warmflash
(74) *Attorney, Agent, or Firm* — Fish & Richardson P.C.

(57) ABSTRACT

The present specification (present disclosure) provides a method for receiving wireless power, performed by a wireless power receiver supporting a magnetic power profile (MPP), in a wireless power transmission system, and a device using same, the method comprising: transmitting a first identification (ID) packet to a wireless power transmitter on a first operating frequency, wherein the first ID packet includes information indicating the presence or absence of a first extended ID (XID) packet; transmitting the first XID packet to the wireless power transmitter on the first operating frequency, wherein the first XID packet includes information indicating that the first XID packet is a packet related to the MPP; and after transmission of the first XID packet, detecting whether the wireless power transmitter is operating on the first operating frequency or operating on a second operating frequency.

15 Claims, 28 Drawing Sheets

(58) Field of Classification Search
CPC ....... H02J 50/10; H04W 12/069; H04L 67/51; H04L 69/22; H04L 69/08; H04L 69/24
See application file for complete search history.

(56) References Cited

U.S. PATENT DOCUMENTS

| | | | |
|---|---|---|---|
| 2016/0172895 A1* | 6/2016 | Lee | H02J 7/04 |
| | | | 320/108 |
| 2016/0308397 A1* | 10/2016 | Jung | H02J 7/007182 |
| 2018/0131413 A1* | 5/2018 | Won | H02J 50/10 |
| 2024/0243620 A1* | 7/2024 | Park | H02J 50/80 |
| 2024/0421640 A1* | 12/2024 | Park | H04L 9/3226 |

\* cited by examiner

|  | $b_7$ | $b_6$ | $b_5$ | $b_4$ | $b_3$ | $b_2$ | $b_1$ | $b_0$ |
|---|---|---|---|---|---|---|---|---|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

Extended Power Transfer Contract

|  | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

FIG. 21

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | \multicolumn{8}{c|}{XID Selector (0xFE)} |||||||||
| $B_1$ | Restricted | R | Chime | Reserved | \multicolumn{4}{c|}{Family Collection} ||||
| $B_2$ | \multicolumn{2}{c|}{Preferred Frequency} || \multicolumn{2}{c|}{Freq Mask} || | | | |
| $B_3$ | \multicolumn{8}{c|}{VRECT} |||||||||
| $B_4$ | \multicolumn{8}{c|}{Alpha0 Rx} |||||||||
| $B_5$ | \multicolumn{8}{c|}{Alpha1 Rx} |||||||||
| $B_6$ | \multicolumn{8}{c|}{Alpha-Kth Rx} |||||||||
| $B_7$ | \multicolumn{8}{c|}{Mfg Rsvd} |||||||||

MPP XID Packet Parameters

FIG. 22

| | b₇ | b₆ | b₅ | b₄ | b₃ | b₂ | b₁ | b₀ | |
|---|---|---|---|---|---|---|---|---|---|
| B₀ | '00' | | | Reference Power | | | | | → e.g. 0x0A |
| B₁ | Reserved | | | | | | | | → e.g. 0x00 |
| B₂ | ZERO | AI | Reserved | OB | ZERO | | Count | | → e.g. 0x00 |
| B₃ | Window Size | | | | Depth | Window Offset | | | → e.g. 0xC4 |
| B₄ | Neg | Pol | | | | Buffer Size | | Dup | → e.g. 0x00 |

Configuration packet (in MPP) (same as Qi packet)

METHOD AND DEVICE FOR PROVIDING COMPATIBILITY WITH MPP IN WIRELESS POWER TRANSMISSION SYSTEM

CROSS-REFERENCE TO RELATED APPLICATIONS

This application is a National Stage application under 35 U.S.C. § 371 of International Application No. PCT/KR2022/009505, filed on Jul. 1, 2022, which claims the benefit of Korean Patent Application No. 10-2021-0088001, filed on Jul. 5, 2021. The disclosures of the prior applications are incorporated by reference in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in wireless charging, an object is to provide a method for identifying profiles between a BPP/EPP wireless power transmitter/wireless power receiver and an MPP wireless power transmitter/wireless power receiver, and a device using the same.

SUMMARY

According to an embodiment of the present specification, a method and apparatus may be provided for transmitting a first XID packet to the wireless power transmitter at a first operating frequency, wherein the first XID packet includes information indicating that the first XID packet is a packet related to the MPP, and detecting whether a wireless power transmitter is operating at a first operating frequency or a second operating frequency after transmission of the first XID packet.

According to the present specification, the intercompatibility problem between PTx/PRx of MPP/BPP/EPP can be solved. In addition, the effect of providing stable protocol progress can be achieved through clear trigger confirmation of MPP/BPP/EPP.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 21 schematically shows an example of an XID packet in MPP.

FIG. 22 schematically shows an example of a CFG packet in MPP.

MODE

In this specification. "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly. "A/B" may refer to "only A", "only B", or "both A and B". For example, "A, B. C" may refer to "A. B. or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A. B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
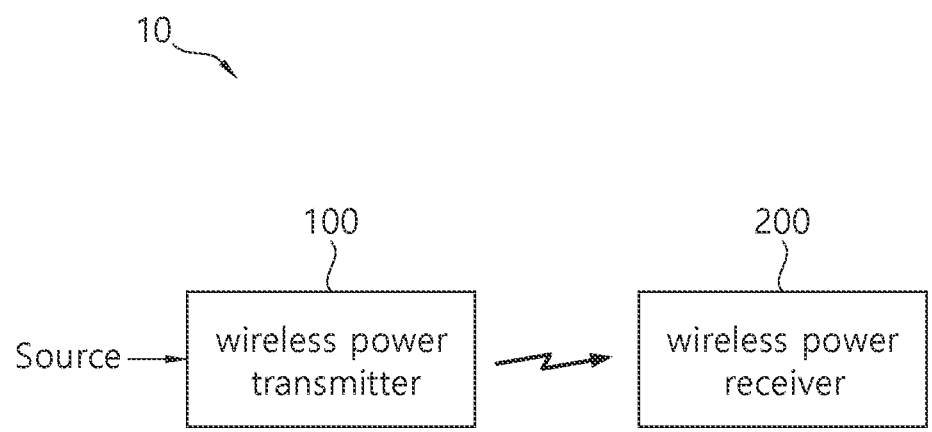
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
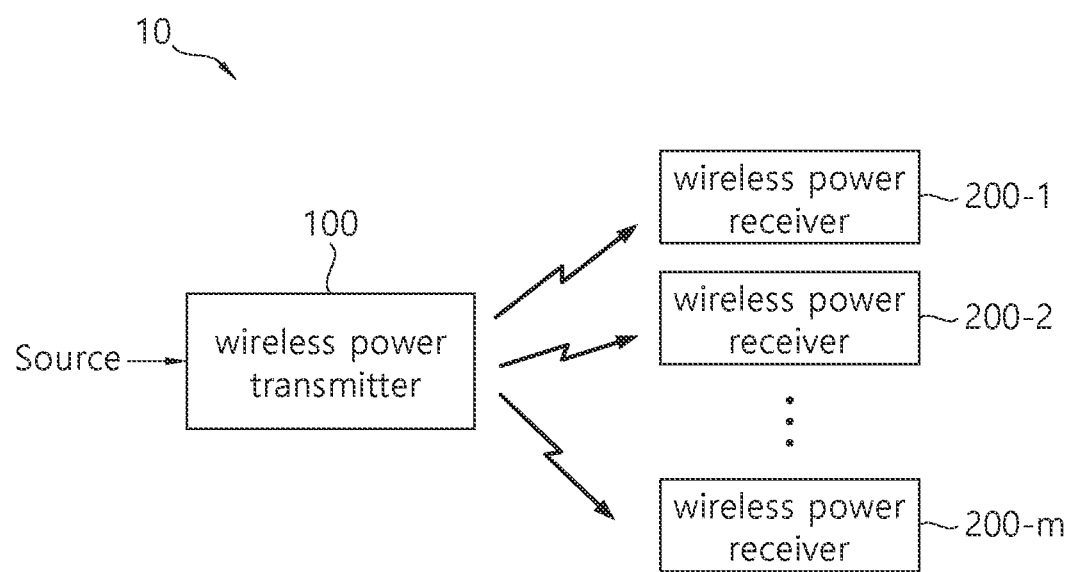
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2 . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3:
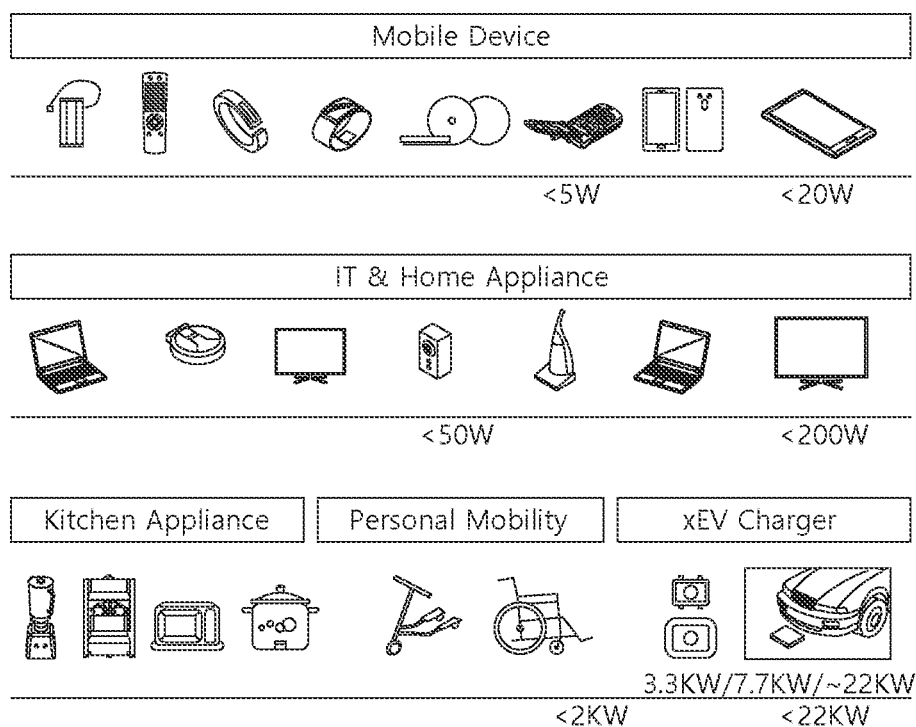
FIG. 3 shows an exemplary embodiment of diverse electronic devices adopting a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5W or less or approximately 20W or less) wireless charging method.

Small-sized/Mid-sized electronic devices, such as laptop computers, robot vacuum cleaners. TV receivers, audio devices, vacuum cleaners, monitors, and so on, may adopt a mid-power (approximately 50W or less or approximately 200W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30

W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user can experience a smart wireless charging service in a hotel. When a user enters a hotel room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Welcome to ###hotel. Select "Yes" to activate smart charging functions: Yes|No Thanks." The smartphone receives the user's input of selecting Yes or No Thanks and performs the next procedure selected by the user. If Yes is selected, the smartphone transmits the information to the wireless charger. And the smartphone and wireless charger perform the smart charging function together.

Smart wireless charging service may also include receiving auto-filled WiFi credentials. For example, a wireless charger transmits WiFi credentials to a smartphone, and the smartphone runs the appropriate app and automatically enters the WiFi credentials received from the wireless charger.

Smart wireless charging service may also include running a hotel application that provides hotel promotions, remote check-in/check-out, and obtaining contact information.

As another example, users can experience smart wireless charging services within a vehicle. When the user gets into the vehicle and places the smartphone on the wireless charger, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user to confirm his or her identity.

In this state, the smartphone automatically connects to the car via WiFi and/or Bluetooth. The smartphone can display the message on the screen with or without an alarm sound. An example of a message may include phrases such as "Welcome to your car. Select "Yes" to synch device with in-car controls: Yes|No Thanks." The smartphone receives the user's input of selecting Yes or No Thanks and performs the next procedure selected by the user. If Yes is selected, the smartphone transmits the information to the wireless charger. And by running the in-vehicle application/display software, the smartphone and wireless charger can perform in-vehicle smart control functions together. Users can enjoy the music they want and check regular map locations. In-vehicle application/display software may include the capability to provide synchronized access for pedestrians.

As another example, users can experience smart wireless charging at home. When a user enters a room and places the smartphone on the wireless charger in the room, the wireless charger transmits wireless power to the smartphone, and the smartphone receives wireless power. In this process, the wireless charger transmits information about the smart wireless charging service to the smartphone. When the smartphone detects that it is placed on the wireless charger, detects reception of wireless power, or when the smartphone receives information about the smart wireless charging service from the wireless charger, the smartphone enters a state where it asks the user for consent (opt-in) to additional features. To this end, the smartphone can display a message on the screen with or without an alarm sound. An example of a message may include phrases such as "Hi xxx, Would you like to activate night mode and secure the building?: Yes|No Thanks." The smartphone receives the user's input of selecting Yes or No Thanks and performs the next procedure selected by the user. If Yes is selected, the smartphone transmits the information to the wireless charger. Smartphones and wireless chargers can at least recognize user patterns and encourage users to lock doors and windows, turn off lights, or set alarms.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

Figure 4:
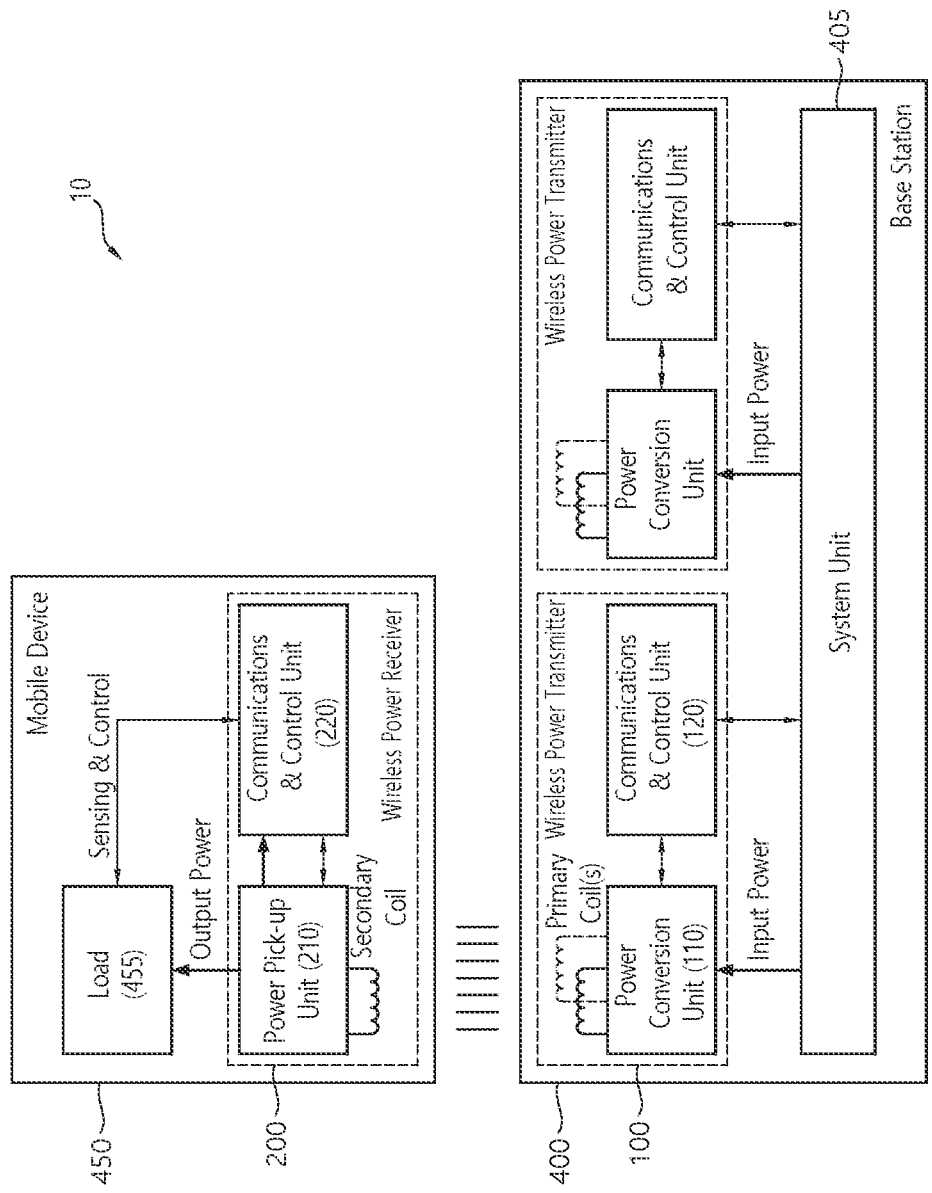
FIG. 4 is a block diagram of a wireless power transmission system according to one embodiment.

FIG. 4 is a block diagram of a wireless power transmission system according to one embodiment.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

Meanwhile, in the WPC system, the wireless power transmitter 100 may be classified, for example, in terms of power transmission amount. At this time, the wireless power transmitter 100 supporting a wireless power transmission amount of up to 5 W (i.e., the wireless power transmitter 100 supporting the BPP protocol) can be classified into, for example, type A wireless power transmitter 100 and type B wireless power transmitter 100, the wireless power transmitter 100 supporting a wireless power transmission amount of up to 15 W (i.e., the wireless power transmitter 100 supporting the EPP protocol) can be classified into, for example, type MP-A (MP-A) wireless power transmitter 100 and type MP-B (type MP-B) wireless power transmitter 100.

Type A and Type MP a Wireless Power Transmitters (100)

Type A and Type MP A wireless power transmitters 100 may have one or more primary coils. Type A and Type MP A wireless power transmitters 100 activate a single primary coil at a time, so a single primary cell matching the activated primary coil can be used.

Type B and Type MP B Wireless Power Transmitter (100)

Type B and Type MP B power transmitters may have a primary coil array. And Type B and Type MP B power transmitters can enable free positioning. To this end, Type B and Type MP B power transmitters can activate one or more primary coils in the array to realize primary cells at different locations on the interface surface.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Meanwhile, although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 5:
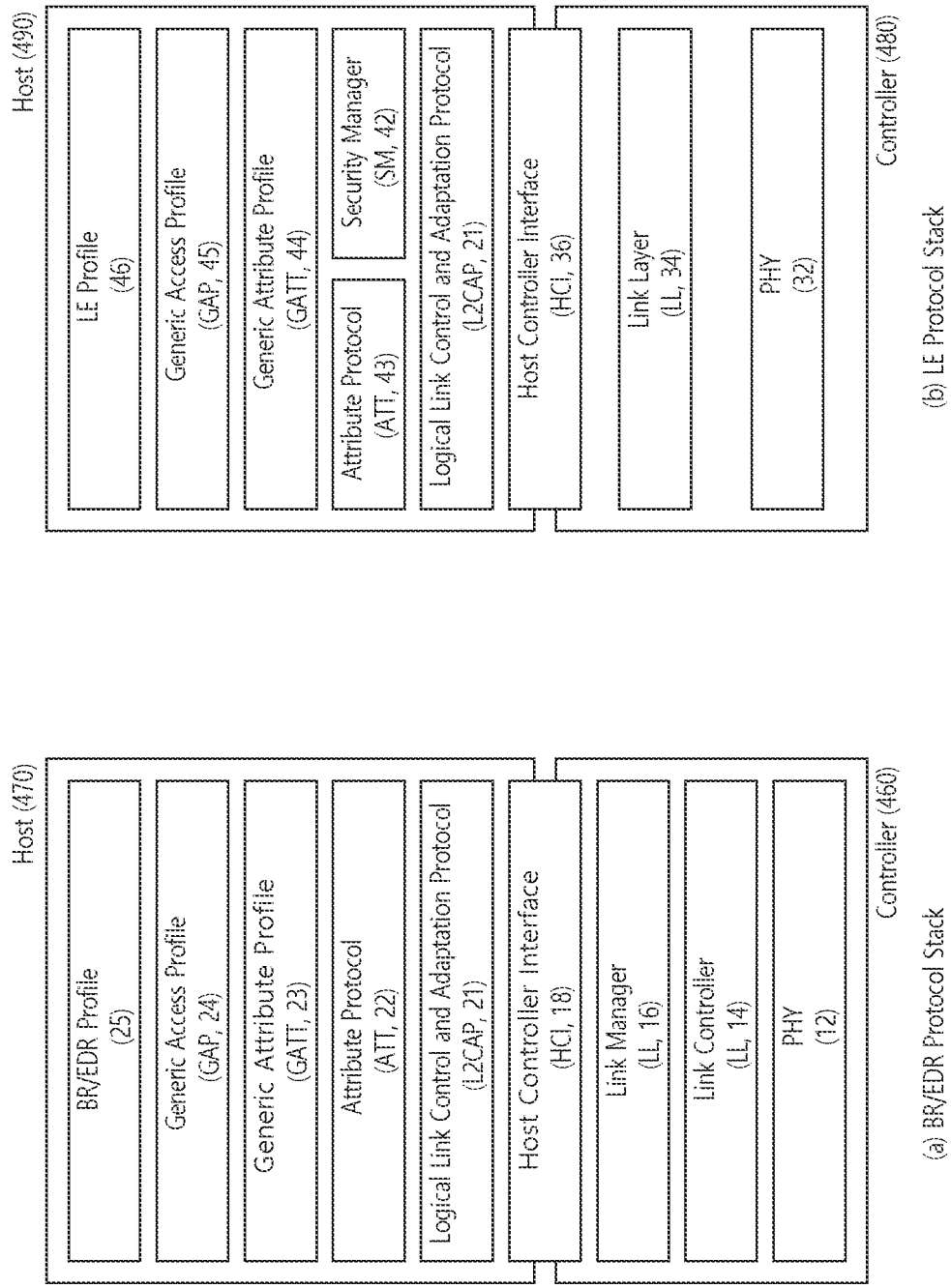
FIG. 5 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 5.

FIG. 5 is a diagram illustrating an example of a Bluetooth communication architecture to which an embodiment according to the present disclosure may be applied.

Referring to FIG. 5, (a) of FIG. 5 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 5, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 5, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as apart of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used w % ben services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 6:
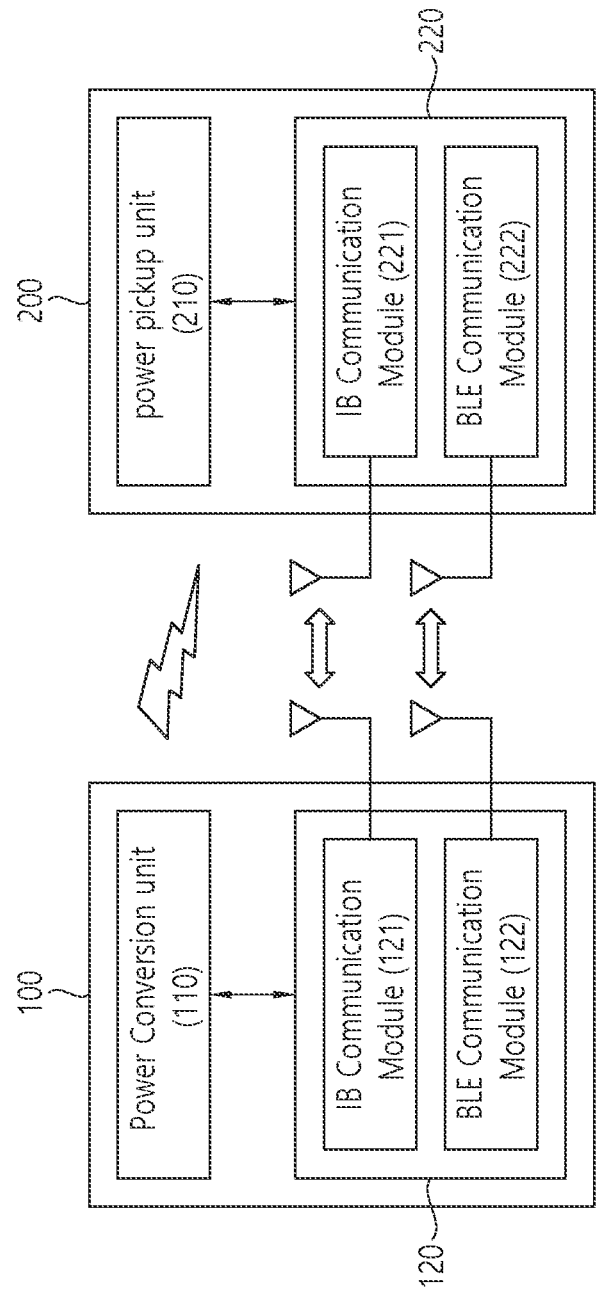
FIG. 6 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 6.

FIG. 6 is a block diagram illustrating a wireless power transfer system using BLE communication according to an example.

Referring to FIG. 6, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 5. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 7:
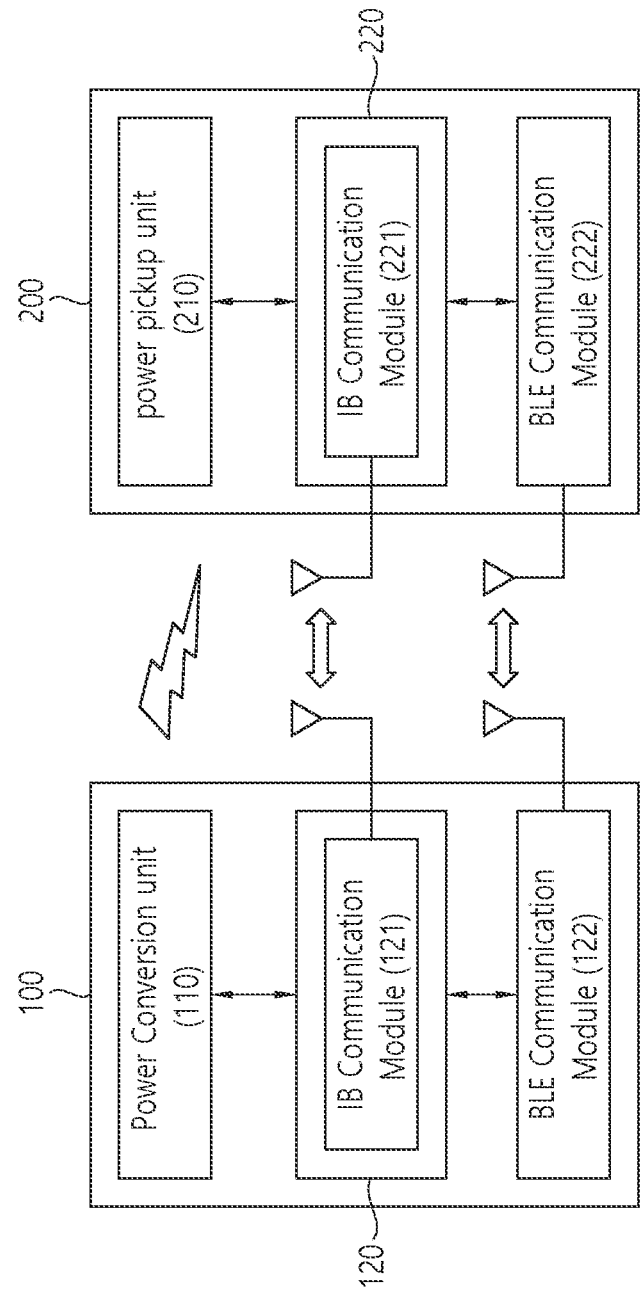
FIG. 7 is a block diagram illustrating a wireless power transfer system using BLE communication according to another example.

FIG. 7 is a block diagram illustrating a wireless power transfer system using BLE communication according to another example.

Referring to FIG. 7, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Meanwhile, when the user places the wireless power receiver 200 within the operating volume of the wireless power transmitter 100, the wireless power transmitter 100 and the wireless power receiver 200 begin communication for the purpose of configuring and controlling power transmission. At this time, the power signal can provide a carrier for all communications, and the protocol for communication can be composed of several steps. Hereinafter, the communication protocol will be described.

Figure 8:
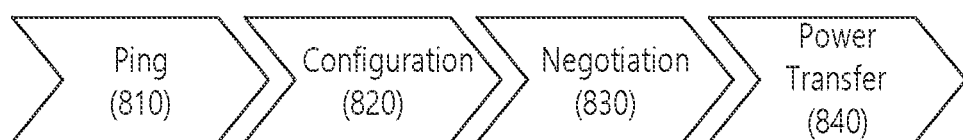
FIG. 8 is a state transition diagram for explaining the wireless power transfer procedure.

FIG. 8 is a state transition diagram for explaining the wireless power transfer procedure.

WPC can define two communication protocols.

Baseline Protocol (or BPP): May refer to an original protocol that supports only one-way communication from the wireless power receiver 200 to the wireless power transmitter 100.

Extended Protocol (or EPP): Supports two-way communication and improved foreign object detection (FOD) functions, and can also support data transport stream functions and authentication options.

Referring to FIG. 8, the power transfer operation between the wireless power transmitter 100 and the wireless power receiver 200 according to an embodiment of the present specification can be largely divided into a ping phase (810), a configuration phase (820), a negotiation phase (830), and a power transfer phase.

Ping Phase (810)

In the ping phase 810, the wireless power transmitter 100 may attempt to establish communication with the wireless power receiver 200. Before attempting to establish communication, measurements may be performed to determine whether there are objects such as bank cards, coins or other metals that may be damaged or heated during power transfer. Here, these measurements can be performed without waking up the wireless power receiver 200.

Here, after obtaining design information from the wireless power receiver 200, the wireless power transmitter 100 may postpone a conclusion about whether the detected metal is a foreign object or a friendly metal to the negotiation phase 830.

Configuration Phase (820)

In the configuration phase 820, the wireless power receiver 200 may send basic identification and configuration data to the wireless power receiver 200. And, both the wireless power transmitter 100 and the wireless power receiver 200 can use this information to create a baseline power transfer contract.

Additionally, the wireless power transmitter 100 and the wireless power receiver 200 may determine whether to continue the baseline protocol or the extended protocol in the configuration phase 820.

Here, the wireless power receiver 200 can use functions such as enhanced FOD, data transport stream, and authentication only when implementing the extended protocol.

Negotiation Phase (830)

In the negotiation phase 830, the wireless power transmitter 100 and the wireless power receiver 200 may establish an extended power transfer contract that includes additional settings and restrictions. Additionally, the wireless power receiver 200 may provide design information to the wireless power transmitter 100. Later, the design information can be used to complete the FOD before transitioning to the power transfer phase 840.

Here, the negotiation phase 830 may correspond to a step that does not exist in the baseline protocol.

Power Transfer Phase (840)

The power transfer phase 840 may be a step in which power is transferred to the load of the wireless power receiver 200.

In the extended protocol, the wireless power transmitter 100 and the wireless power receiver 200 may perform system calibration when this step begins. This stage may occasionally be interrupted to renegotiate elements of the power transfer contract. However, power transfer may continue even during this renegotiation.

Below, as previously explained, each protocol for Ping Phase 810, Configuration Phase 820, Negotiation Phase 830, and Power Transfer Phase 840 will be explained in more detail.

1. Ping Phase (810)

When the ping phase 810 begins, the wireless power transmitter 100 does not yet know whether the wireless power receiver 200 is within the operating volume. In addition, the wireless power transmitter 100 cannot recognize the wireless power receiver 200. For that reason, this system is usually disabled due to lack of power signal.

In this situation, before the wireless power transmitter 100 starts a digital ping to request a response from the wireless power receiver 200, the wireless power transmitter 100 may go through the following steps.

Figure 9:
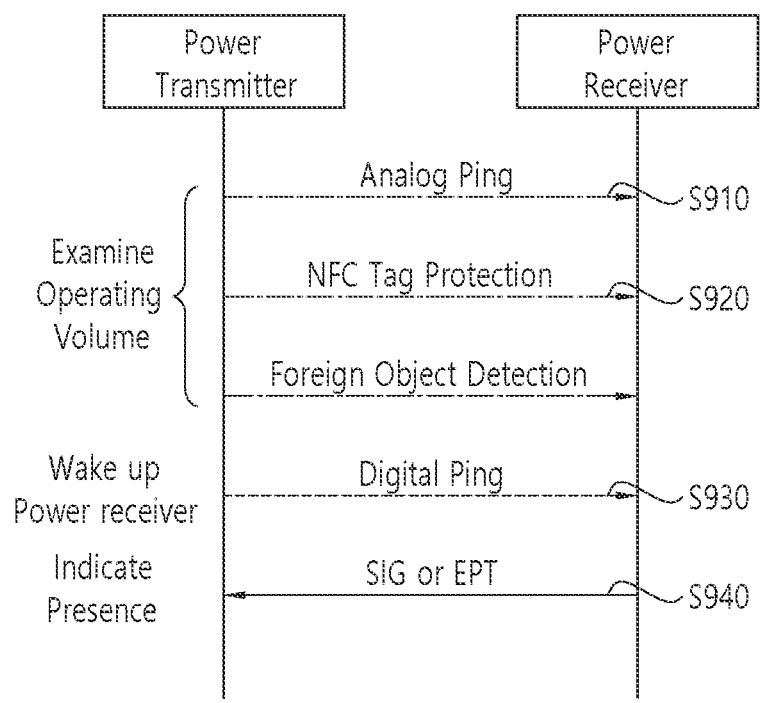
FIG. 9 schematically shows an example of the protocol of the ping phase 810.

FIG. 9 schematically shows an example of the protocol of the ping phase 810.

According to FIG. 9, the wireless power transmitter 100 can perform analog ping (S910). That is, the wireless power transmitter 100 can confirm whether an object exists in the operating volume by transmitting an analog ping. For example, a wireless power transmitter can detect whether an object exists in the operating space based on a change in current in the transmission coil or primary coil.

The wireless power transmitter 100 may apply NFC tag protection (S920). Here, NFC tag protection can be performed through the following procedures.

a) First, it can be confirmed whether one or more of the detected objects include an NFC tag.

b) Afterwards, it can be checked whether the object containing the NFC tag can withstand the power signal without damage.

c) If the wireless power transmitter 100 determines that the NFC tag cannot withstand the power signal, it does not start digital ping and maintains the ping phase, the wireless power transmitter 100 can inform the user of the reason why it cannot proceed.

The wireless power transmitter 100 may perform foreign object detection (S930). That is, the wireless power transmitter 100 can collect information helpful in determining whether there is a foreign object other than the wireless power receiver 200. For this purpose, the wireless power transmitter 100 can use various methods such as a pre-power FOD method.

Meanwhile, in the three steps (S910, S920, and S930) described above, the radio power receiver may not operate.

If the wireless power transmitter 100 performs the above steps and determines that the wireless power receiver 200 is potentially present in the operating volume, the wireless power transmitter 100 may start a digital ping (S940). Here, the digital ping may request a response such as a signal strength (SIG) data packet or an end power transfer (EPT) data packet from the wireless power receiver 200.

Thereafter, the wireless power transmitter 100 may receive the SIG or EPT from the wireless power receiver 200 (S950). Here, the SIG data packet may provide a measure of coupling, and the SIG data packet may include information about signal strength values. Additionally, the EPT data packet may provide a request to stop power transmission and a reason for the request.

If the wireless power transmitter 100 does not receive the above response from the wireless power receiver 200, the wireless power transmitter 100 may repeat the above steps while remaining in the ping phase 810.

2. Configuration Phase (820)

The configuration phase 820 is part of the following protocol.

The wireless power receiver 200 can identify itself to the wireless power transmitter 100.

The wireless power receiver 200 and the wireless power transmitter 100 can establish a baseline power transfer contract.

The wireless power receiver 200 and the wireless power transmitter 100 can determine the protocol variant to be used for power transmission.

In the configuration phase 820, the wireless power transmitter 100 and the wireless power receiver 200 may continue to operate using the digital ping parameter. This may mean that the power and current levels of both the wireless power transmitter 100 and the wireless power receiver 200 change only when the user moves the wireless power receiver 200 from position within the operating volume.

Hereinafter, the protocol in the configuration phase 820 will be described in more detail.

Figures 10, 11:
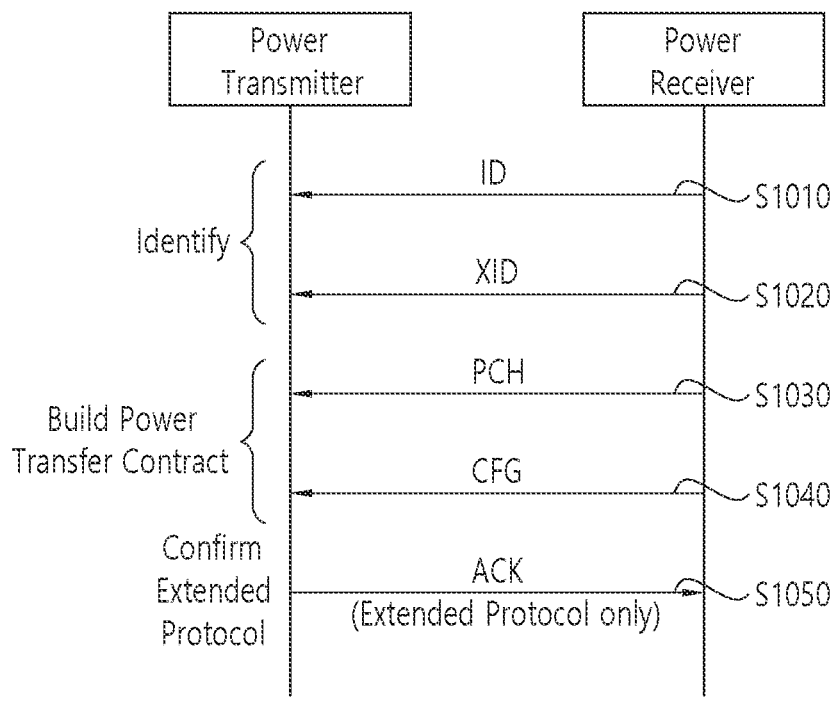
FIG. 10 schematically shows an example of the protocol of the configuration phase 820.
FIG. 11 is a diagram illustrating a message field of a configuration packet (CFG) of a wireless power reception device according to an embodiment.

FIG. 10 schematically shows an example of the protocol of the configuration phase 820.

According to FIG. 10, the wireless power transmitter 100 may receive an identification (ID) from the wireless power receiver 200 (S1010). Alternatively, the wireless power transmitter 100 may also receive an extended identification (XID) from the wireless power receiver 200 (S1020). That is, the wireless power receiver 200 may identify itself using an ID data packet and, optionally, an XID data packet.

The wireless power transmitter 100 may selectively receive a power control hold-off (PCH) data packet from the wireless power receiver 200 (S1030), the wireless power transmitter 100 may receive a CFG data packet from the wireless power receiver 200 (S1040). That is, the wireless power receiver 200 can provide data for use in a power transfer contract using PCH and/or CFG data packets.

Finally, the wireless power transmitter 100 can check the extended protocol if possible (S1050).

Each data packet described above can be summarized as follows.

ID: The ID data packet may be information that identifies the wireless power receiver 200. Here, the ID may include a manufacturer code, basic device identifier, etc. In addition, the ID may also include information that identifies the presence or absence of an XID data packet in the setup phase.

XID: XID data packets may contain additional identification data.

PCH: The PCH data packet may configure the delay between the reception of the CE data packet and the wireless power transmitter 100 starting coil current adjustment.

CFG: CFG data packets can provide basic configuration data.

For example, a CFG data packet can provide all parameters governing power transfer in the baseline protocol. In addition, CFG data packets can provide all FSK communication parameters used in the extended protocol. Additionally, CFG data packets may provide additional functions of the wireless power receiver 200.

FIG. 11 is a diagram illustrating a message field of a configuration packet (CFG) of a wireless power reception device according to an embodiment.

According to FIG. 11, the configuration packet (CFG) according to one embodiment may have a header value of 0x51, and the message field of the configuration packet (CFG) may include a 1-bit authentication (AI) flag and a 1-bit outband (OB) flag.

The authentication flag (AI) indicates whether the wireless power receiving device supports the authentication function. For example, if the value of the authentication flag (AI) is '1', it indicates that the wireless power receiving device supports the authentication function or can operate as an authentication initiator, if the value of the authentication flag (AI) is '0', it may indicate that the wireless power receiving device does not support the authentication function or cannot operate as an authentication initiator.

The out-of-band (OB) flag indicates whether the wireless power receiving device supports out-of-band communication. For example, if the value of the out-of-band (OB) flag is '1', the wireless power receiver indicates out-of-band communication, if the value of the outband (OB) flag is '0', it may indicate that the wireless power receiving device does not support outband communication.

Provision of the ID and/or XID described above is for identification purposes. Additionally, the provision of PCH and/or CFG is for the construction of a power transfer contract.

3. Negotiation Phase (830)

The negotiation phase 830 is part of an extended protocol that allows the wireless power transmitter 100 and the wireless power receiver 200 to change the power transfer contract. There are two types of this stage.

Negotiation phase (830): The negotiation phase (830) directly follows the configuration phase (820) and serves to create an initial extended power transfer contract. In addition, the negotiation phase 830 also serves to complete the pre-power FOD function. Here, the length of the negotiation phase is not limited.

Renegotiation phase: The renegotiation phase can interrupt the power transfer phase (840) multiple times and generally serves to adjust a single element of the power transfer contract. In addition. FOD/qf, FOD/rf, and SRQ/rpr data packets may not be used in the renegotiation phase. Constraints on CE data packets in the power transfer phase 840 limit the length of the renegotiation phase.

In the negotiation or renegotiation phase, the power transfer contract related to the reception/transmission of wireless power between a wireless power receiving device and a wireless power transmitting device is expanded or changed, or a renewal of the power transfer contract is made that adjusts at least some of the elements of the power transfer contract, or information may be exchanged to establish out-of-band communication.

Figure 12:
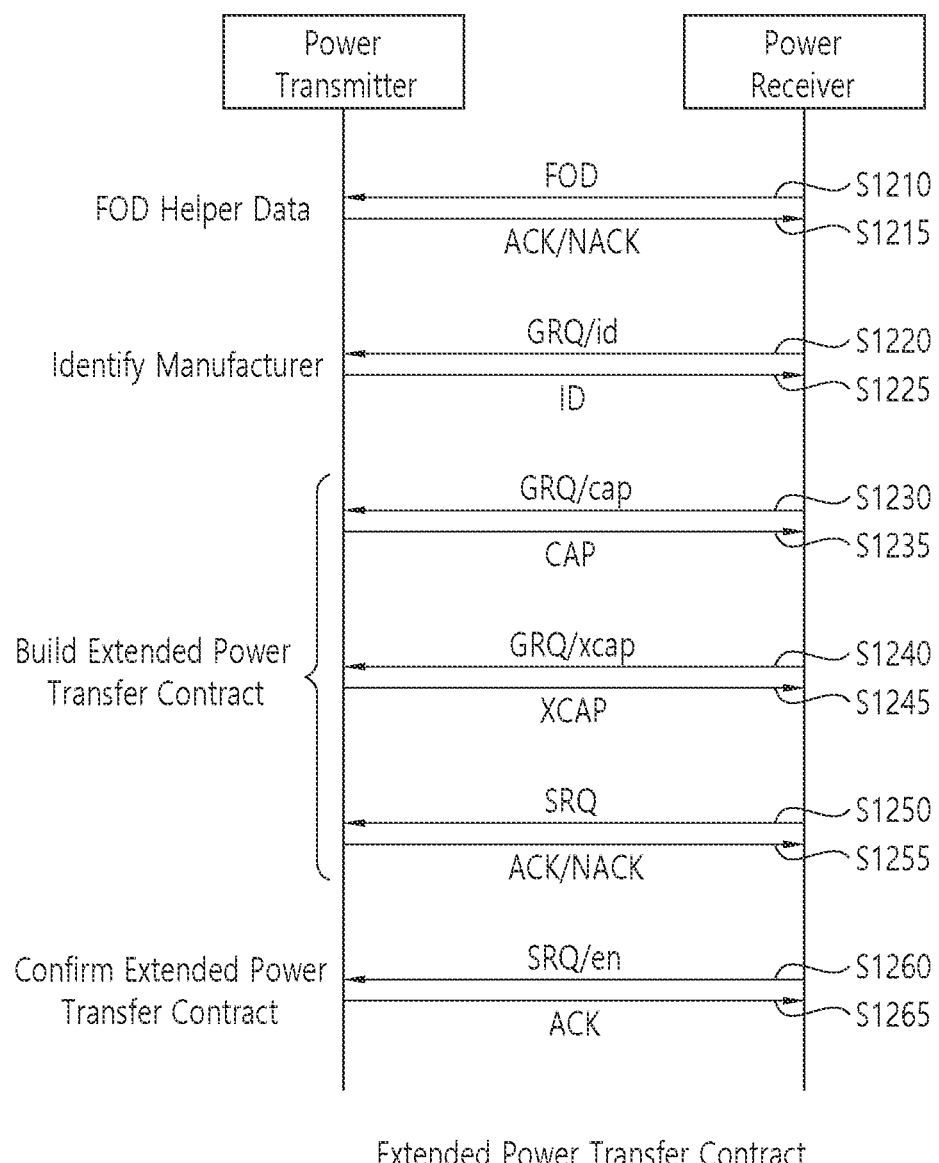
FIG. 12 is a flowchart schematically illustrating a protocol of a negotiation stage or a renegotiation stage according to an embodiment.

FIG. 12 is a flowchart schematically illustrating a protocol of a negotiation stage or a renegotiation stage according to an embodiment.

Referring to FIG. 12, the wireless power transmitter 100 may receive a FOD status data packet (e.g. FOD) from the wireless power receiver 200 (S1210). Here, the wireless power receiver 200 can use the FOD status data packet to inform the wireless power transmitter 100 of the effect its presence has on selected properties of the reference wireless power transmitter 100. And, the wireless power transmitter 100 can configure the FOD function using this information.

The wireless power transmitter 100 may transmit an ACK/NAK for the FOD status data packet to the wireless power receiver 200 (S1215).

Meanwhile, the wireless power receiver 200 may receive an identification data packet (ID), a capabilities data packet (CAP), and an extended CAP (XCAP) of the wireless power transmitter 100 using a general request data packet (GRQ).

The general request packet (GRQ) may have a header value of 0x07 and may include a 1-byte message field. The message field of the general request packet (GRQ) may include a header value of a data packet that the wireless power receiver 200 requests from the wireless power transmitter 100 using the GRQ packet.

For example, in the negotiation phase or renegotiation phase, the wireless power receiver 200 may transmit a GRQ packet (GRQ/id) requesting an ID packet of the wireless power transmitter 100 to the wireless power transmitter 100 (S1220).

The wireless power transmitter 100 that has received the GRQ/id may transmit an ID packet to the wireless power receiver 200 (S1225). The ID packet of the wireless power transmitter 100 includes information about the 'Manufacturer Code'. The ID packet containing information about the 'Manufacturer Code' allows the manufacturer of the wireless power transmitter 100 to be identified.

Or, in the negotiation phase or re-negotiation phase, the wireless power receiver 200 may transmit a GRQ packet (GRQ/cap) requesting a capability packet (CAP) of the wireless power transmitter 100 to the wireless power transmitter 100 (S1230). The message field of GRQ/cap may include the header value (0x31) of the capability packet (CAP).

The wireless power transmitter 100 that has received the GRQ/cap may transmit a capability packet (CAP) to the wireless power receiver 200 (S1235).

Or, in the negotiation phase or re-negotiation phase, the wireless power receiver 200 may transmit a GRQ packet (GRQ/xcap) requesting a capability packet (CAP) of the wireless power transmitter 100 to the wireless power transmitter 100 (S1240). The message field of GRQ/xcap may include the header value (0x32) of the performance packet (XCAP).

The wireless power transmitter 100 that has received GRQ/xcap may transmit a capability packet (XCAP) to the wireless power receiver 200 (S1245).

Figures 13, 14:
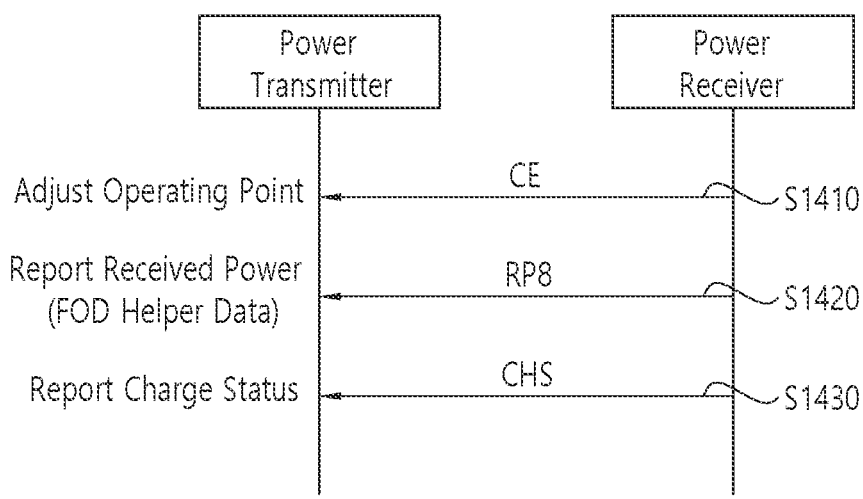
FIG. 13 is a diagram illustrating a message field of a capability packet (CAP) of a wireless power transmission device according to an embodiment.
FIG. 14 schematically shows a flow chart of the data flow for the power transfer phase 840 in the baseline protocol.

FIG. 13 is a diagram illustrating a message field of a capability packet (CAP) of a wireless power transmission device according to an embodiment.

A capability packet (CAP) according to one embodiment may have a header value of 0x31 and, referring to FIG. 13, may include a 3-byte message field.

Referring to FIG. 13, the message field of the capability packet (CAP) may include a 1-bit authentication (AR) flag and a 1-bit outband (OB) flag.

The authentication flag (AR) indicates whether the wireless power transmitter 100 supports the authentication function. For example, if the value of the authentication flag (AR) is 'T', it indicates that the wireless power transmitter 100 supports an authentication function or can operate as an authentication responder, if the value of the authentication flag (AR) is '0', it may indicate that the wireless power transmitter 100 does not support the authentication function or cannot operate as an authentication responder.

The outband (OB) flag indicates whether the wireless power transmitter 100 supports outband communication. For example, if the value of the outband (OB) flag is '1', the wireless power transmitter 100 instructs outband communication, if the value of the out-of-band (OB) flag is '0', this may indicate that the wireless power transmitter 100 does not support out-of-band communication.

In the negotiation phase, the wireless power receiver 200 can receive the capability packet (CAP) of the wireless power transmitter 100 and check whether the wireless power transmitter 100 supports the authentication function and whether out-band communication is supported.

Returning to FIG. 12, the wireless power receiver 200 can update the elements of the power transfer contract (Power Transfer Contract) related to the power to be provided in the power transfer phase using at least one specific request packet (SRQ, Specific Request data packet) in the negotiation phase or re-negotiation phase (S1250), ACK/NAK for this can be received (S1255).

Meanwhile, in order to confirm the extended power transfer contract and end the negotiation phase, the wireless power receiver 200 transmits SRQ/en to the wireless power transmitter 100 (S1260), it can receive ACK from the wireless power transmitter 100 (S1265).

4. Power Transfer Phase (840)

The power transfer phase 840 is a part of the protocol in which actual power is transferred to the load of the wireless power receiver 200. Here, power transfer may proceed according to the conditions of the power transfer contract created in the negotiation phase 830.

<Power Control Based on CE>

The wireless power receiver 200 can control the power level by transmitting control error (CE) data that measures the deviation between the target and the actual operating point of the wireless power receiver 200 to the wireless power transmitter 100. The wireless power transmitter 100 and wireless power receiver 200 aim to make the control error data zero, at which point the system will operate at the target power level.

<In-Power Transfer FOD Method>

In addition to control error data, the wireless power transmitter 100 and the wireless power receiver 200 may exchange information to facilitate FOD. The wireless power receiver 200 regularly reports the amount of power it receives (received power level) to the wireless power transmitter 100, the wireless power transmitter 100 may inform the wireless power receiver 200 whether a foreign object has been detected. Methods that can be used for FOD in the power transfer phase may correspond to, for example, power loss calculations. In this approach, the wireless power transmitter 100 compares the received power level reported by the wireless power receiver 200 with the amount of transmitted power (transmitted power level) and it can send a signal (whether a foreign object has been monitored) to the wireless power receiver 200 when the difference exceeds a threshold.

<Renegotiation Phase>

If necessary depending on the situation, the wireless power transmitter 100 or the wireless power receiver 200 may request renegotiation of the power transfer contract during the power transfer phase. Examples of changed circumstances in which renegotiation of a power transfer contract may occur include:

When the wireless power receiver 200 requires (substantially) more power than previously negotiated.

When the wireless power transmitter 100 detects that it is operating at low efficiency.

When the wireless power transmitter 100 can no longer maintain its current power level due to increased operating temperature (Or vice versa, i.e., when the wireless power receiver 200 can operate at a higher power level after sufficiently cooling).

Here, an example of a specific protocol for the renegotiation phase is the same as described above.

<Data Transport Stream>

The wireless power transmitter 100 and the wireless power receiver 200 may start a data transmission stream and exchange application level data throughout the power transfer phase 840.

Here, an important common application is authentication, where each side can verify the other's credentials in a tamper-proof manner. For example, the wireless power receiver 200 may want to check the credentials of the wireless power transmitter 100 to ensure that the wireless power transmitter 100 can be trusted to operate safely at high power levels. Having the appropriate credentials can mean you have passed compliance testing.

Accordingly, the present specification may provide a method of starting power transfer at a low power level and controlling power to a higher level only after successfully completing the authentication protocol.

<Protocol in Power Transfer Phase 840>

So far, the operation between the wireless power transmitter 100 and the wireless power receiver 200 in the power transfer phase 840 has been briefly described. Hereinafter, for a smooth understanding of the operation in the power transfer phase 840, the protocol in the power transfer phase 840 will be described separately as a baseline protocol and an extended protocol.

FIG. 14 schematically shows a flow chart of the data flow for the power transfer phase 840 in the baseline protocol.

According to FIG. 14, the wireless power receiver 200 may transmit CE to the wireless power transmitter 100 (S1410). Here, the wireless power receiver 200 can generally transmit CE data packets several times per second.

The wireless power receiver 200 may generally transmit a received power (RP) data packet (RP8 in the baseline protocol) to the wireless power transmitter 100 once every 1.5 seconds (S1420).

Optionally, the wireless power receiver 200 may transmit a charge status (CHS) data packet to the wireless power transmitter 100 (S1430).

The data packet described above can be summarized and explained as follows.

CE: CE data packets can provide feedback on the desired power level. CE data packets may include a control error value, here, the control error value may be a signed integer value that is a relative measurement value of the deviation between the actual operating point and the target operating point of the wireless power receiver 200. If the control error value at this time is a positive value, it indicates that the actual operating point is below the target operating point, the wireless power transmitter 100 may be requested to increase the power signal. If the control error value is a negative value, it indicates that the actual operating point is above the target operating point, the wireless power transmitter 100 may be requested to reduce the power signal.

RP8: RP8 data packets can report the received power level. Here, RP8 data packets can only be included in the baseline protocol.

CHS. CHS data packets can provide the charge level of the battery at the load.

Figure 15:
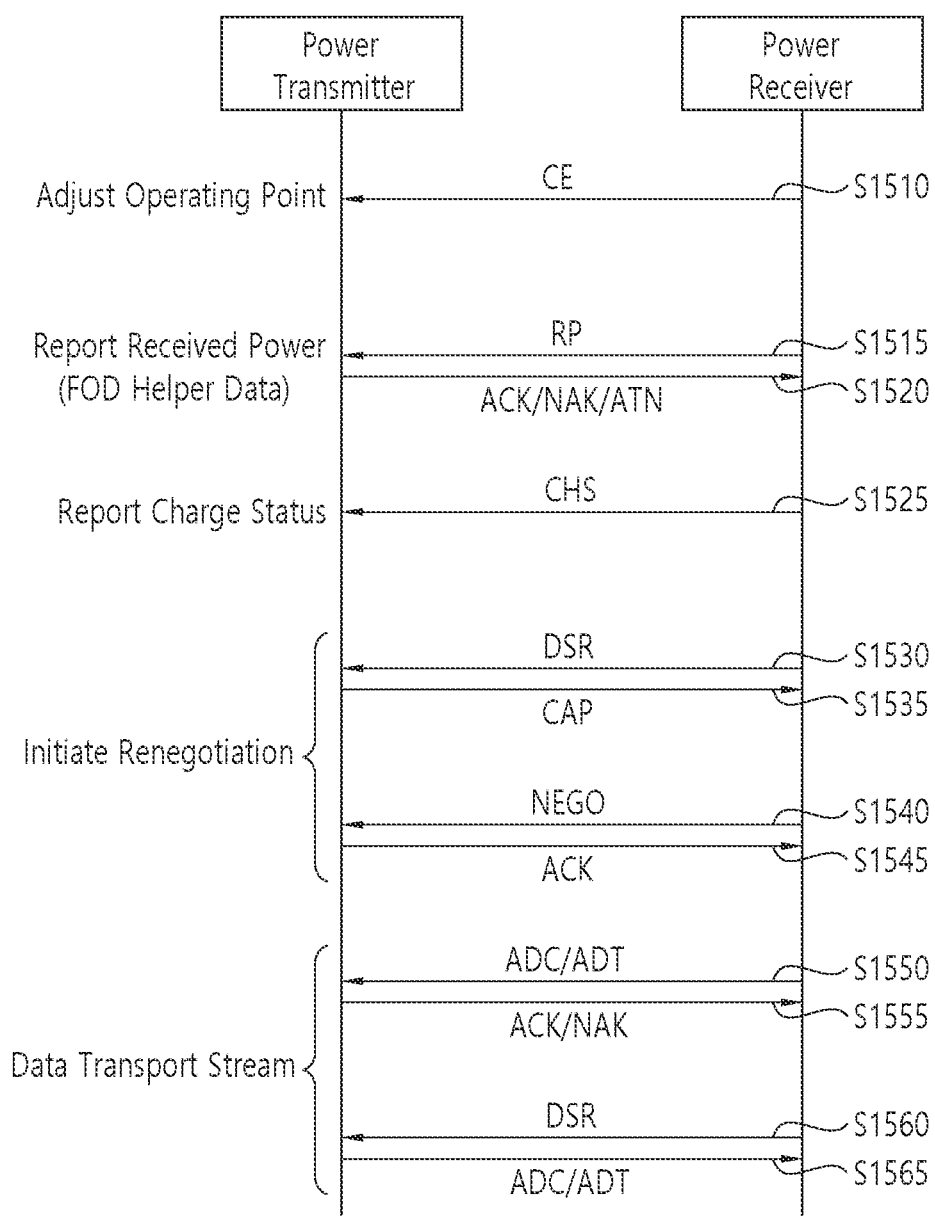
FIG. 15 schematically shows a flow chart of the data flow for the power transfer phase 840 in the extended protocol.

FIG. 15 schematically shows a flow chart of the data flow for the power transfer phase 840 in the extended protocol.

According to FIG. 15, the wireless power receiver 200 may transmit CE to the wireless power transmitter 100 (S1510). Here, the wireless power receiver 200 can generally transmit CE data packets several times per second.

The wireless power receiver 200 may generally transmit a received power (RP) data packet (RP in the extended protocol) to the wireless power transmitter 100 once every 1.5 seconds (S1515).

In the power transfer phase, control error packets (CE) and received power packets (RP) are data packets that must be repeatedly transmitted/received according to the required timing constraints to control wireless power.

The wireless power transmitter 100 can control the level of wireless power transmitted based on the control error packet (CE) and received power packet (RP) received from the wireless power receiver 200.

Meanwhile, in the extended protocol, the wireless power transmitter 100 may respond to the received power packet (RP) with a bit pattern such as ACK, NAK, or ATN (S1520).

The fact that the wireless power transmitter 100 responds with ACK to a received power packet (RP/0) with a mode value of 0 means that power transmission can continue at the current level.

When the wireless power transmitter 100 responds with NAK to a received power packet (RP/0) with a mode value of 0, this means that the wireless power receiver 200 must reduce power consumption.

For received power packets with a mode value of 1 or 2 (RP/1 or RP/2), when the wireless power transmitter 100 responds with ACK, this means that the wireless power receiver 200 has accepted the power correction value included in the received power packet (RP/1 or RP/2).

For received power packets with a mode value of 1 or 2 (RP/1 or RP/2), when the wireless power transmitter 100 responds with NAK, it means that the wireless power receiver 200 did not accept the power correction value included in the received power packet (RP/1 or RP/2).

The received power packet (RP/1) with a mode value of 1 described above may mean the first calibration data point, a received power packet (RP/2) with a mode value of 2 may mean an additional calibration data point. Here, the wireless power receiver may transmit a received power packet (RP/2) with a mode value of 2 to the wireless power transmitter multiple times to transmit a plurality of additional power calibration values, the wireless power transmitter can proceed with a calibration procedure based on the received RP/1 and multiple RP/2.

When the wireless power transmitter 100 responds with ATN to the received power packet (RP), it means that the wireless power transmitter 100 requests permission for communication. That is, the wireless power transmitter 100 may transmit an attention (ATN) response pattern to request permission to transmit a data packet in response to an RP data packet. In other words, the wireless power transmitter 100 may transmit an ATN to the wireless power receiver 200 in response to the RP data packet and request the wireless power receiver 200 for permission to transmit the data packet.

Optionally, the wireless power receiver 200 may transmit a charge status (CHS) data packet to the wireless power transmitter 100 (S1525).

Meanwhile, the wireless power transmitter 100 and the wireless power receiver 200 can exchange data stream response (DSR) data packets, CAP data packets, and NEGO data packets to initiate renegotiation of elements of the power transfer contract (typically guaranteed load power).

For example, the wireless power receiver 200 transmits a DSR data packet to the wireless power transmitter 100 (S1530), the wireless power transmitter 100 may transmit a CAP to the wireless power receiver 200 (S1535).

In addition, the wireless power receiver 200 transmits a NEGO data packet to the wireless power transmitter 100 (S1540), the wireless power transmitter 100 may transmit an ACK to the wireless power receiver 200 in response to the NEGO data packet (S1545).

Here, the data packets related to the start of the renegotiation phase can be summanzed as follows.
DSR: Any one of the following values can be set in the DSR data packet.
i) 0x00-DSR/nak: Indicates that the last received data packet of the wireless power transmitter 100 was rejected.
ii) 0x33-DSR/poll: Invite the wireless power transmitter 100 to send a data packet.
iii) 0x55-DSR/nd: Indicates that the last received data packet from the wireless power transmitter 100 was not expected.
iv) 0xFF-DSR/ack: Confirms that the last received data packet of the wireless power transmitter 100 has been properly processed.
CAP: The CAP data packet provides information about the function of the wireless power transmitter 100. The specific details are the same as described previously.
NEGO: NEGO data packets may request the wireless power transmitter 100 to proceed to the re-negotiation phase.

The wireless power transmitter 100 and the wireless power receiver 200 may use auxiliary data transport (ADC), auxiliary data transport (ADT), and DSR data packets to exchange application level data.

That is, from the perspective of transmission and reception of a data transmission stream for exchange of application-level data, the wireless power receiver 200 may transmit ADC/ADT to the wireless power transmitter 100 (S1550), the wireless power transmitter 100 may transmit an ACK/NAK to the wireless power receiver 200 in response (S1555). In addition, the wireless power receiver 200 can transmit DSR to the wireless power transmitter 100 (S1560), the wireless power transmitter may transmit ADC/ADT to the wireless power receiver (S1565).

Here, the data transport stream serves to transfer application-level data from the data stream initiator to the data stream responder. Additionally, application level data can be broadly divided into i) authentication applications, and ii) proprietary (general purpose) applications.

Among application level data, messages/information related to the authentication application can be organized as follows.

The message used in the authentication procedure is called an authentication message. Authentication messages are used to convey information related to authentication. There are two types of authentication messages. One is an authentication request, and the other is an authentication response. An authentication request is sent by an authentication initiator, and an authentication response is sent by an authentication responder. The wireless power transmitting device and receiving device can be an authentication initiator or an authentication responder. For example, if the wireless power transmitting device is the authentication initiator, the wireless power receiving device becomes the authentication responder, and if the wireless power receiving device is the authentication initiator, the wireless power transmitting device becomes the authentication responder.

Authentication request messages include GET_DIGESTS, GET_CERTIFICATE, and CHALLENGE.
GET_DIGESTS: This request can be used to retrieve certificate chain digests. The wireless power receiver 200 can request a desired number of digests at a time.
GET_CERTIFICATE: This request can be used to read segments of the target certificate chain.
CHALLENGE: This request can be used to initiate authentication of a power transmitter product device.
The authentication response message includes DIGESTS, CERTIFICATE, CHALLENGE_AUTH, and ERROR.
DIGESTS: The wireless power transmitter 100 can send a certificate chain summary using the DIGESTS response and report slots containing a valid certificate chain summary.
CERTIFICATE: This response can be used by the wireless power transmitter 100 to send the requested segment of the certificate chain.
CHALLENGE_AUTH: The wireless power transmitter 100 can respond to the CHALLENGE request using CHALLENGE_AUTH.
ERROR: This response can be used to transmit error information from the power transmitter.

The authentication message may be called an authentication packet, authentication data, or authentication control information. Additionally, messages such as GET_DIGEST and DIGESTS may also be called GET_DIGEST packets, DIGEST packets, etc.

Meanwhile, as described above, the wireless power receiver 200 and the wireless power transmitter 100 can transmit application level data through a data transmission stream. Application-level data transmitted through a data transport stream may consist of a data packet sequence with the following structure.
Initial ADC data packet that opens the stream.
i) Types of messages contained in the stream.
ii) Number of data bytes in the stream.
A series of ADT data packets containing the actual message.
The final ADC/end data packet that closes the stream.

Hereinafter, the data transport stream for an example in which the above ADC, ADT, and ADC/end data packets are used will be described using the drawings.

Figure 16:
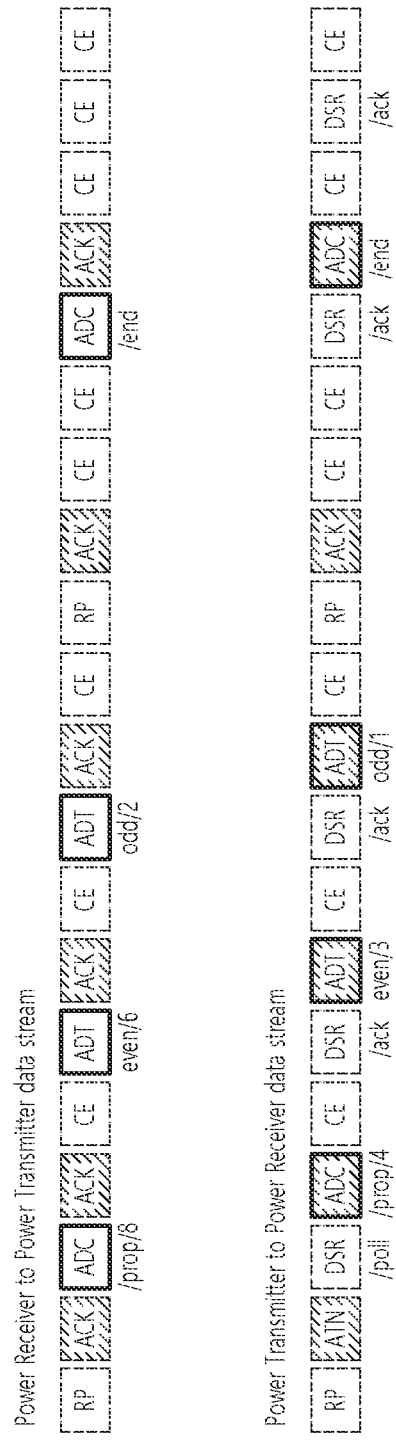
FIG. 16 illustrates an application-level data stream between the wireless power transmitter 100 and the wireless power receiver 200 according to an example.

FIG. 16 illustrates an application-level data stream between the wireless power transmitter 100 and the wireless power receiver 200 according to an example.

Referring to FIG. 16, the data stream may include auxiliary data control (ADC) data packets and/or auxiliary data transport (ADT) data packets.

ADC data packets are used to open a data stream. ADC data packets can indicate the type of message included in the stream and the number of data bytes. On the other hand, ADT data packets are sequences of data containing the actual message. ADC/end data packets are used to signal the end of a stream. For example, the maximum number of data bytes in a data transport stream may be limited to 2047.

ACK or NAC (NACK) is used to notify whether ADC data packets and ADT data packets are normally received. Between the transmission timing of the ADC data packet and the ADT data packet, control information necessary for wireless charging, such as a control error packet (CE) or DSR, may be transmitted.

Using this data stream structure, authentication-related information or other application-level information can be transmitted and received between a wireless power transmitter and a receiver.

An example for understanding the operation between the wireless power transmitter 100 and the wireless power receiver 200 in the power transfer phase 840 described above may be as follows.

Figure 17:
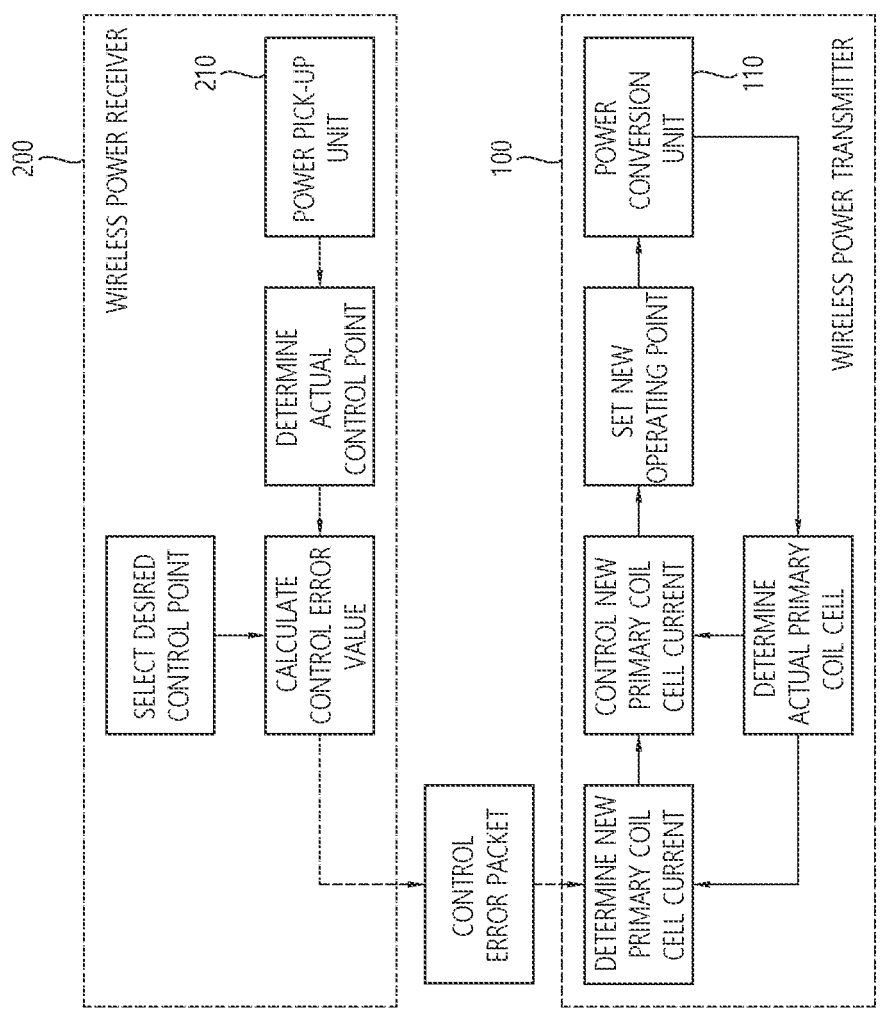
FIG. 17 shows a power control method according to one embodiment.

FIG. 17 shows a power control method according to one embodiment.

In the power transfer phase in FIG. 17, the wireless power transmitter 100 and the wireless power receiver 200 can control the amount of power transferred by performing communication along with power transmission and reception. The wireless power transmitter and wireless power receiver operate at a specific control point. The control point represents the combination of voltage and current provided from the output of the wireless power receiver when power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 17 will not be completely excluded. And, additional control of the transmitted power may be performed by using the method of FIG. 17.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Figure 18:
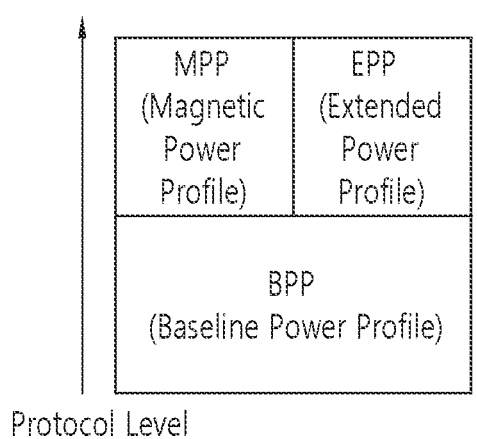
FIG. 18 conceptually shows the structure of a power profile according to the protocol level.

FIG. 18 conceptually shows the structure of a power profile according to the protocol level.

According to FIG. 18, as previously described, the WPC standard defines a baseline power profile (BPP) and an extended power profile (EPP). BPP relates to a wireless power transmitter and receiver that supports power transmission of 5 W, and EPP relates to a wireless power transmitter and receiver that supports power transmission in a range greater than 5 W and less than 30 W.

In addition, the wireless power transfer system seeks to provide a new power transfer profile, and among the power transfer profiles proposed at this time is a magnetic power profile (MPP). MPP may correspond to a proprietary extension from Apple based on Qi v1.3.0.

Here, as can be seen in the drawing, the wireless power transmitter and wireless power receiver basically support BPP, and additionally, the wireless power transmitter and wireless power receiver can support BPP and MPP at the same time. Along the same level, the wireless power transmitter and wireless power receiver may support BPP and EPP simultaneously. In some cases, the wireless power transmitter and wireless power receiver may support all BPP, EPP, and MPP.

Hereinafter, the protocol in BPP, the protocol in EPP, and the protocol in MPP will be described respectively.

A. Protocol in BPP

Figure 19:
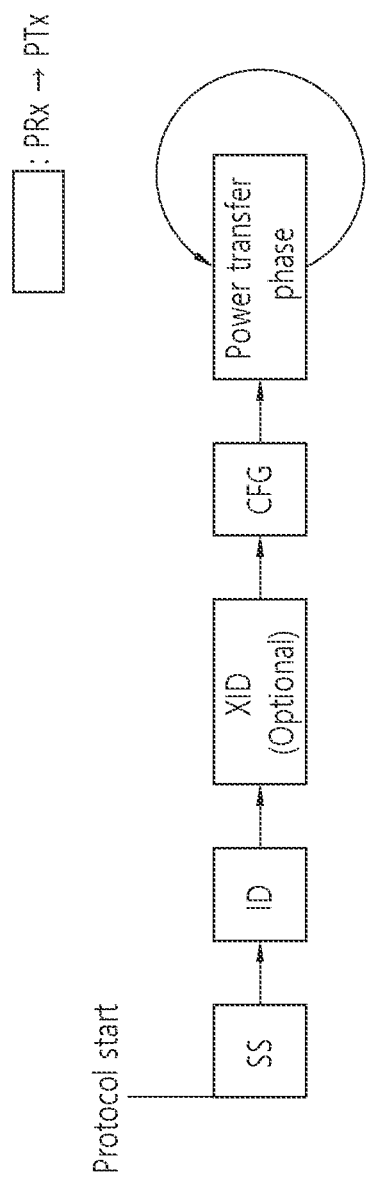
FIG. 19 schematically shows the protocol in BPP.

FIG. 19 schematically shows the protocol in BPP.

According to FIG. 19, the wireless power receiver may transmit signal strength (SS) (in other words, SIG) (in the ping phase) to the wireless power transmitter. Afterwards, the wireless power receiver can send an ID packet (in the configuration phase) to the wireless power transmitter, and optionally can also transmit an XID packet. And, (in the configuration phase) the wireless power receiver can transmit a CFG packet to the wireless power transmitter. At this time, specific examples of each packet are as described above.

Meanwhile, according to BPP, the wireless power receiver can enter the power transfer phase without entering the negotiation phase, and the wireless power receiver can receive wireless power from the wireless power transmitter in the power transfer phase.

In summary, in WPC Qi v1.3, the wireless power receiver and/or wireless power transmitter basically performs a protocol based on the structure of BPP, when a wireless power receiver and/or wireless power transmitter wishes to increase power transmission, a protocol extended to EPP is used.

B. Protocol in EPP

Figure 20:
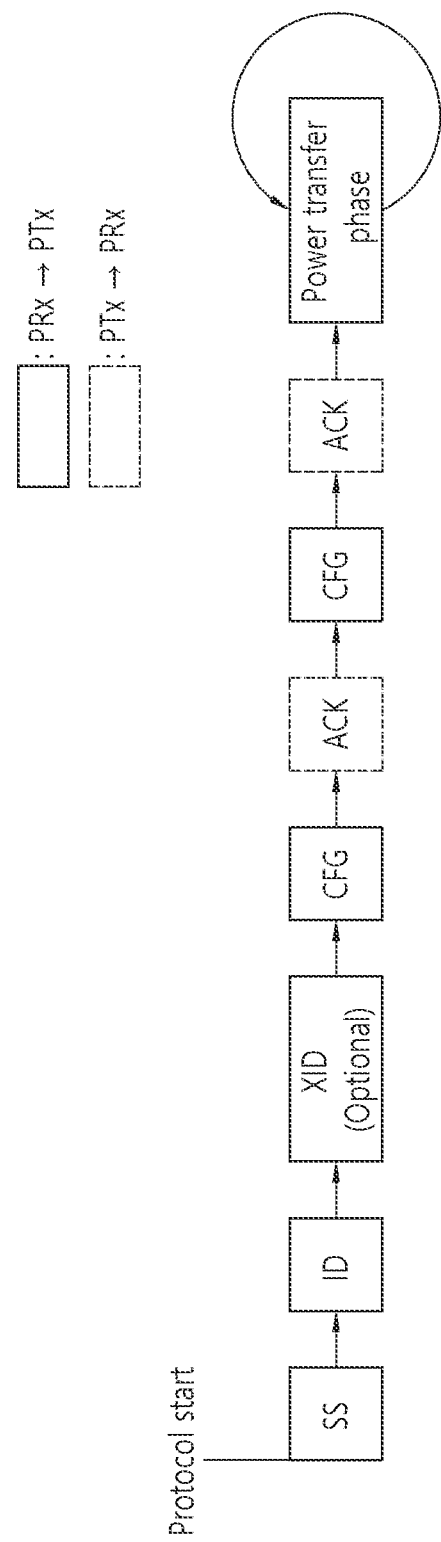
FIG. 20 schematically shows the protocol in EPP.

FIG. 20 schematically shows the protocol in EPP.

According to FIG. 20, the wireless power receiver may transmit signal strength (SS) (in other words, SIG) (in the ping phase) to the wireless power transmitter. Afterwards, the wireless power receiver can send an ID packet (in the configuration phase) to the wireless power transmitter, and optionally can also transmit an XID packet. And, (in the configuration phase) the wireless power receiver can transmit a CFG packet to the wireless power transmitter.

Meanwhile, unlike in BPP, when EPP is in progress, the 'Neg' field in the CFG packet may be set to 1. And, the wireless power receiver can receive an ACK for the CFG from the wireless power transmitter.

In other words, EPP is an extension of BPP, while the wireless power receiver and wireless power transmitter are proceeding with the protocol according to BPP, if the wireless power receiver that supports EPP wants to proceed with EPP, the 'Neg' bit of the CFG packet can be set to 1. And, if the wireless power transmitter supports EPP, it responds with ACK to the CFG and the wireless power transmitter and wireless power receiver can switch to EPP. If the 'Neg' bit of CFG is 1 but the wireless power transmitter is a BPP wireless power transmitter, the BPP wireless power transmitter does not respond to the above CFG. That is, if the response to CFG is no response, both parties can perform wireless power transmission and reception based on BPP.

At this time, a more specific example of CFG can be found in FIG. 11 described above.

When the wireless power receiver receives an ACK for the CFG from the wireless power transmitter, the wireless power receiver and the wireless power transmitter can enter a negotiation phase. In other words, the negotiation phase may correspond to a phase that does not exist in BPP. Here, 'Nego' in the drawing may represent packets transmitted in the negotiation phase. At this time, specific examples of packets transmitted in the negotiation phase are the same as described above.

Thereafter, wireless power is transmitted and received based on EPP between the wireless power transmitter and/or wireless power receiver based on the power transfer contract negotiated in the negotiation phase. If negotiation fails in the negotiation phase, the wireless power transmitter and/or wireless power receiver switches to BPP and performs wireless power transmission and reception based on BPP.

C. Protocol in MPP

In MPP, the wireless power receiver and wireless power transmitter have a structure that starts the protocol with BPP and then enters MPP. Accordingly, the startup behavior of MPP is explained as follows.

Basically, by the wireless power receiver transmitting in the following order: SIG (Signal Strength)→ID (Identification)→XID (Extended Identification)→PCH (Power Control Hold-Off; optional)→CFG (Configuration packet), the initial operation is performed.

Here, SIG/ID may have the same configuration as the configuration in BPP/EPP described above. One difference is that since MPP requires the transmission of an XID packet, the 'ext' bit in the ID packet is set to 1 in MPP.

Hereinafter, the XID packet in MPP will be described in more detail.

FIG. 21 schematically shows an example of an XID packet in MPP.

According to FIG. 21, an XID packet in MPP may include an 'XID Selector' field, a 'Restricted' field, and a 'Freq Mask' field.

Here, whether MPP is supported can be determined depending on whether the value of 'XID selector' is 0xFE. That is, if the value of B_0 of the XID is 0xFE, the XID at this time may correspond to information indicating that the wireless power receiver supports MPP.

The 'Restricted' field may correspond to information indicating whether the wireless power receiver operates in MPP restricted mode or MPP full mode. If the wireless power receiver selects to operate in MPP restricted mode, the above field can be set to 1. Meanwhile, in other cases (for example, when the wireless power receiver selects not to operate in MPP restricted mode), the above field may be set to 0.

The 'Preferred Frequency' field may mean the MPP preferred frequency. Here, if the wireless power receiver wants to retrieve information from the wireless power transmitter before switching the frequency (in the negotiation phase), this field can be set to 128 kHz. Otherwise, the wireless power receiver can set this field to 360 kHz.

The 'Freq Mask' field corresponds to a field for determining whether the operating frequency of 360 kHz is supported. That is, if the 'Freq Mask' field is set to 0, 360 kHz is supported.

In summary, the wireless power transmitter determines whether the 'Ext' bit of the ID received from the wireless power receiver is set to 1 and determines whether B_0 of the XID is set to 0xFE, the wireless power transmitter can determine whether the wireless power receiver supports MPP.

Hereinafter, CFG packets in MPP will be described in more detail.

FIG. 22 schematically shows an example of a CFG packet in MPP.

According to FIG. 22, the configuration packet in MPP may be basically the same as the configuration packet in BPP/EPP. And, fields not used in MPP (AI, OB, Count, Neg, Pol, Depth, Buffer Size, Dup, etc.) can be set to 0, for example.

Meanwhile, in MPP, two profiles may exist. One of them is MPP Restricted mode (also known as MPP Baseline Profile), and the other is MPP Full mode (also known as MPP Full Profile).

To briefly explain the difference between the two, in MPP restricted mode, the 'restricted' field in the XID is set to 1, but in MPP full mode, the 'restricted' field in the XID is set to 0.

In addition, in MPP restricted mode, the wireless power receiver does not transmit CFG or receive ACK for it at the first operating frequency (e.g. 128 khz), in MPP full mode, the wireless power receiver transmits CFG and receives an MPP ACK pattern for it.

In addition, in MPP restricted mode, the wireless power receiver and wireless power transmitter do not negotiate, but in MPP full mode, MPP negotiation is performed with the wireless power receiver.

Below, MPP restricted mode and MPP full mode will be described in more detail. Here, MPP restricted mode can be mixed with the MPP baseline profile, and MPP full mode can be mixed with the MPP full profile.

MPP Baseline Profile (MPP Restricted Mode+Frequency Change)

When the wireless power receiver enters MPP restricted mode, it proceeds with the MPP baseline profile. Here, FSK communication is not performed in MPP restricted mode, and the operating frequency can only support 360 kHz. In addition, in the case of 128 kHz, the Qi BPP protocol is implemented.

Figure 23:
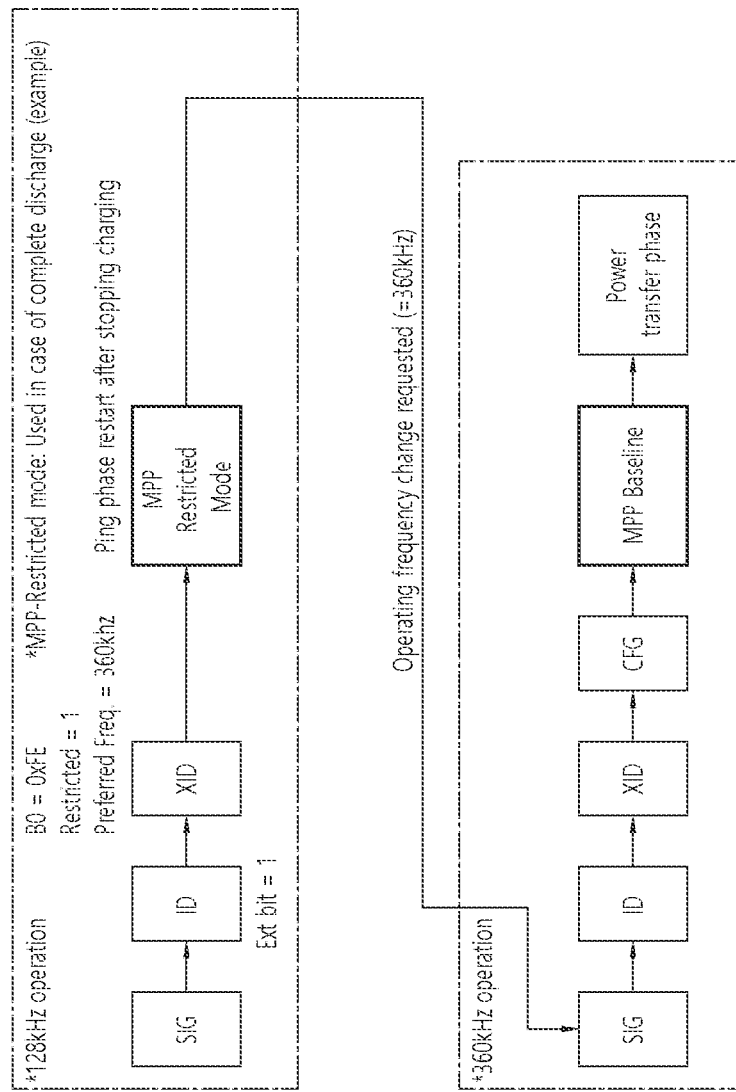
FIG. 23 schematically shows an example of operation in the MPP baseline profile.

FIG. 23 schematically shows an example of operation in the MPP baseline profile.

According to FIG. 23, the wireless power receiver preferentially operates on a first operating frequency (e.g. 128 kHz). Then, when all operations at the first operating frequency are completed, the wireless power receiver changes the operating frequency to the second operating frequency (e.g. 360 khz) and performs the operation at the second operating frequency. This is explained in more detail as follows.

A wireless power receiver that wishes to perform an operation in the MPP baseline profile transmits a SIG to the wireless power transmitter on a first operating frequency.

The wireless power receiver transmits an ID packet to the wireless power transmitter on the first operating frequency. At this time, when the wireless power receiver wants to perform an operation in the MPP baseline profile, the 'Ext' bit in the ID is set to 1 because the wireless power receiver must transmit an XID packet to the wireless power transmitter.

Thereafter, the wireless power receiver transmits an XID packet to the wireless power transmitter on the first operating frequency. At this time. B0 in the XID packet may be set to 0xFE to indicate that the wireless power receiver supports MPP operation. And, 'Restricted' in the XID packet can be set to 1. In addition, 'Preferred Freq.' in the XID packet may be set to, for example, the second operating frequency (e.g. 360 kHz).

After confirming that the wireless power receiver itself operates in MPP restricted mode, it stops operating on the first operating frequency. That is, the wireless power receiver stops charging and restarts the ping phase.

The frequency at which the wireless power receiver operates after restarting may be a second operating frequency (e.g. 360 kHz).

The wireless power receiver may transmit SIG, ID, XID, and CFG packets to the wireless power transmitter, respectively, at the second operating frequency. Additionally, the wireless power receiver can perform a wireless power transfer phase based on the wireless power transmitter and the MPP baseline profile.

MPP Full Profile (MPP Full Mode+Frequency Change)

Figure 24:
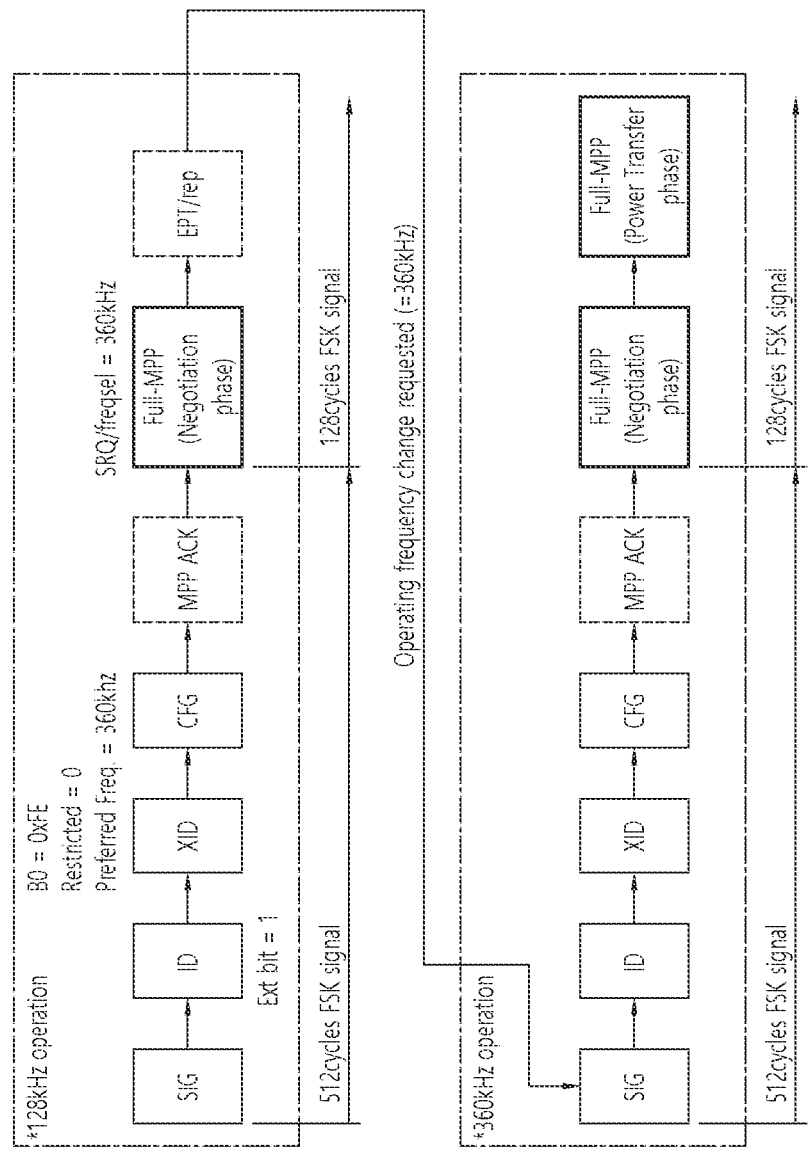
FIG. 24 schematically shows an example of operation in the MPP full profile.

FIG. 24 schematically shows an example of operation in the MPP full profile.

According to FIG. 24, the wireless power receiver preferentially operates on a first operating frequency (e.g. 128 kHz). Then, when all operations at the first operating frequency are completed, the wireless power receiver changes the operating frequency to the second operating frequency (e.g. 360 khz) and performs the operation at the second operating frequency. This is explained in more detail as follows.

A wireless power receiver that wishes to perform an operation in the MPP full profile transmits a SIG to the wireless power transmitter on a first operating frequency.

The wireless power receiver transmits an ID packet to the wireless power transmitter on the first operating frequency. At this time, when the wireless power receiver wants to perform an operation in the MPP full profile, the 'Ext' bit in the ID is set to 1 because the wireless power receiver must transmit an XID packet to the wireless power transmitter.

The wireless power receiver transmits an XID packet to the wireless power transmitter on the first operating frequency. At this time, B0 in the XID packet may be set to 0xFE to indicate that the wireless power receiver supports MPP operation. Additionally, 'Restricted' in the XID packet is set to 0, thereby indicating that the wireless power receiver intends to operate in MPP full mode. In addition, 'Preferred Freq.' in the XID packet may be set to, for example, the second operating frequency (e.g. 360 kHz).

The wireless power receiver may transmit a CFG packet to the wireless power transmitter, and the wireless power receiver may receive an MPP ACK in response to the CFG packet. Here, the MPP ACK may have a different bit pattern from the bit pattern of the ACK used in EPP, and at this point, the wireless power receiver can check whether the wireless power transmitter supports MPP.

The wireless power receiver may enter the negotiation phase on the first operating frequency and negotiate the full MPP mode in the negotiation phase.

After negotiation, the wireless power receiver may transmit EPT/rep to the wireless power transmitter (e.g., by entering a power transfer phase), this may result in the power signal being removed on the wireless power transmitter and/or wireless power receiver. That is, the wireless power receiver stops charging, enters MPP full mode, and restarts the ping phase.

The frequency at which the wireless power receiver operates after restarting may be a second operating frequency (e.g. 360 kHz).

The wireless power receiver may transmit SIG, ID, XID, and CFG packets to the wireless power transmitter, respectively, at the second operating frequency. And, the wireless power receiver can receive an MPP ACK as a response to the CFG packet transmitted at the second operating frequency.

The wireless power receiver may enter a negotiation phase on a second operating frequency, negotiation for full MPP mode can be further performed during the negotiation phase.

Afterwards, the wireless power receiver may enter the power transfer phase, and power transfer at this time may be performed based on full MPP.

So far, the BPP, EPP, and MPP protocols have been described. As explained earlier, there are similarities in protocols between BPP. EPP, and MPP, but there are also clear differences.

In the above situation, according to the prior art, since BPP/EPP was developed with some consideration for mutual compatibility between the BPP wireless power transmitter/wireless power receiver and the EPP wireless power transmitter/wireless power receiver, no major compatibility problems occurred.

However, MPP, which is different from the above BPP/EPP, does not use all of the protocols of BPP/EPP, so MPP may have compatibility issues with BPP/EPP. In particular, since the market dominance of wireless power transmitters and/or wireless power receivers using the MPP standard is not low, problems with compatibility between BPP/EPP and MPP may be maximized according to the prior art.

In order to solve this problem, clear triggering for profiles between BPP/EPP and MPP (e.g. configuration to identify BPP/EPP/MPP wireless power transmitter and/or wireless power receiver, etc.) needs to be provided, however, currently, configuration for identification of profiles between the BPP/EPP wireless power transmitter/wireless power receiver and the MPP wireless power transmitter/wireless power receiver is not provided.

Accordingly, in this specification, a specific configuration for identifying profiles between a BPP/EPP wireless power transmitter/wireless power receiver and an MPP wireless power transmitter/wireless power receiver will be described.

In particular, this specification seeks to provide a configuration in which the MPP wireless power receiver can identify whether the wireless power transmitter is a BPP/EPP wireless power transmitter or an MPP wireless power transmitter by only checking the operating frequency of the wireless power transmitter.

The following drawings were prepared to explain a specific example of the present specification. Since the names of specific devices or specific signals/messages/fields described in the drawings are provided as examples, the technical features of this specification are not limited to the specific names used in the drawings below.

Figure 25:
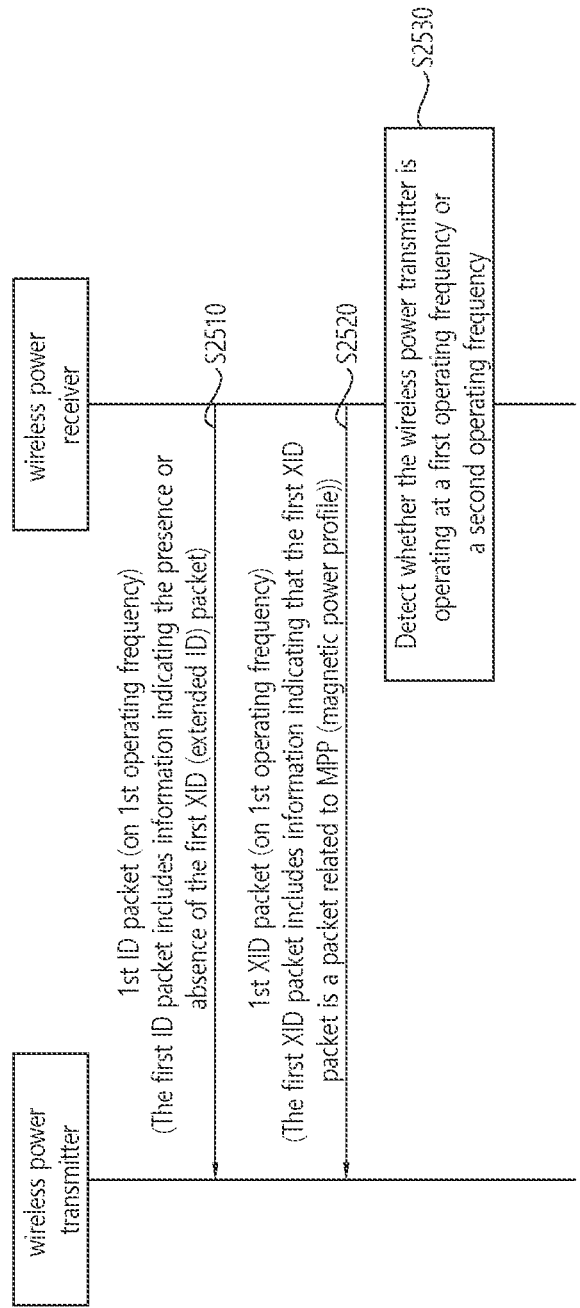
FIG. 25 is a flowchart of a method for identifying a profile of a power transmitter, according to an embodiment of the present specification.

FIG. 25 is a flowchart of a method for identifying a profile of a power transmitter, according to an embodiment of the present specification.

According to FIG. 25, the wireless power receiver may transmit the first ID packet to the wireless power transmitter (S2510). Here, the frequency at which the first ID packet is transmitted may be the first operating frequency, and the first operating frequency at this time may be located between 100 kHz and 145 kHz (for example, 128 kHz).

The wireless power receiver in FIG. 25 may be, for example, a wireless power receiver that supports MPP (or intends to operate as MPP). At this time, the wireless power receiver may be a wireless power receiver that supports MPP restricted mode (or operates in MPP restricted mode), as described above, or, as described above, it may be a wireless power receiver that supports MPP full mode (or wants to operate in MPP full mode).

Here, as described above, when the wireless power receiver is an MPP wireless power receiver, an XID packet is transmitted to the wireless power transmitter. Accordingly, the wireless power receiver can set the information indicating the presence or absence of the XID packet included in the ID packet (e.g. 'ext' bit) to a value representing the presence of the XID, thereafter, the wireless power receiver may transmit the corresponding ID packet to the wireless power transmitter.

The wireless power receiver may transmit the first XID packet to the wireless power transmitter (S2510). Here, the frequency at which the first XID packet is transmitted may be the first operating frequency. At this time, the first XID packet may include information indicating that the first XID packet is a packet related to a magnetic power profile (MPP). Specifically, as described above, by the wireless power receiver setting B0 of the XID packet to 0xFE, the XID can inform the wireless power transmitter that the wireless power receiver is an MPP wireless power receiver.

At this time, as described above, the MPP wireless power receiver initially operates at the first operating frequency and then changes the operating frequency to the second operating frequency (e.g., 360 khz) to perform the MPP power transfer operation.

Meanwhile, regarding subsequent operations, the operating frequency of the wireless power transmitter that performs (supports) the BPP/EPP operation is different from the operating frequency of the wireless power transmitter that performs (supports) the MPP operation.

For example, even in the subsequent operation of performing (supporting) the BPP/EPP operation, at least one transmission operation such as SIG, ID, XID, CFG, etc. is performed at the first operating frequency.

However, the wireless power transmitter that performs (supports) the MPP operation initially performs the operation at the first operating frequency and then changes the operating frequency to the second operating frequency. And the wireless power transmitter that performs (supports) the MPP operation performs at least one SIG, ID, XID, CFG, etc. transmission operation on the second operating frequency.

In consideration of this, the wireless power receiver, after transmission of the first XID packet, it is possible to detect whether the wireless power transmitter is operating at the first operating frequency or the second operating frequency (S2530). At this time, the first operating frequency may be different from the second operating frequency. And, the first operating frequency may have a value between, for example, 100 kHz and 145 kHz, and the second operating frequency may have a value of, for example, 360 kHz.

Previously, 360 kHz was proposed as an example for the second operating frequency, but in the proposal of this specification, the second operating frequency is not limited to the above frequency. In particular, in the proposal of this specification, the wireless power receiver may provide information about the second operating frequency to the wireless power transmitter (or the wireless power transmitter to the wireless power receiver). At this time, information indicating the second operating frequency may be transmitted through, for example, packets such as ID/XID % CFG/Prop, which were described previously.

Meanwhile, based on detecting that the wireless power transmitter is operating at the first operating frequency, the wireless power receiver may detect that the wireless power transmitter performs an operation based on a baseline power profile (BPP) or extended power profile (EPP). After detection, the wireless power receiver may transmit a second ID packet, etc. on the first operating frequency.

Or, based on detecting that the wireless power transmitter is operating at a second operating frequency, the wireless power receiver can detect that the wireless power transmitter is a wireless power transmitter that performs an operation based on MPP. After detection, the wireless power receiver may transmit the second ID packet and the second XID packet on the second operating frequency.

Here, the wireless power receiver may receive the wireless power from the wireless power transmitter based on MPP on the second operating frequency. The MPP operation performed by the wireless power transmitter at the second operating frequency may be, for example, an MPP operation based on MPP restricted mode or MPP full mode.

So far, the operation from the perspective of the MPP wireless power receiver has been described. Below, for a better understanding of the specification, the operation with the MPP wireless power receiver will be described from the perspective of the BPP wireless power transmitter, the EPP wireless power transmitter, and the MPP wireless power transmitter.

1. Perspective on BPP Wireless Power Transmitter

The profile of the wireless power receiver capable of operating with the BPP wireless power transmitter can be described in the table as follows.

TABLE 2

| Case | PTx's Profile | PRx's Profile | Details |
|------|---------------|---------------|---------|
| #1 | BPP | BPP | No problem |
| #2 | BPP | EPP | No problem |
| #3 | BPP | MPP | PRx cannot check whether PTx is MPP PTx. |

(1) Case 1

In the case of BPP PTx and BPP PRx, there is no need to switch profiles because the power profile is the same between the PTx and PRx. That is, a BPP operation is performed between the wireless power transmitter and the wireless power receiver.

(2) Case 2

For BPP PTx and EPP PRx, between the corresponding PTx and PRx, PRx first selects BPP/EPP (by setting the 'neg' field in CFG to 0 or 1), the wireless power receiver determines whether ACK is received from the PTX or not. Here, since the BPP wireless power transmitter cannot transmit ACK for CFG whose 'neg' field is marked as 1, the EPP wireless power receiver may determine that the wireless power transmitter is a BPP wireless power transmitter based on the fact that no ACK for CFG is received from the wireless power transmitter. Afterwards, the wireless power transmitter and wireless power receiver can proceed with a profile based on BPP.

(3) Case 3

This specification seeks to provide specific protocols for the cases of BPP PTx and MPP PRx. For that reason, as explained above, a protocol is provided between BPP and EPP to support mutual identification, however, since there is currently no or insufficient protocol between BPP and MPP to support mutual identification, problems may arise in wireless power transfer between the wireless power transmitter and wireless power receiver.

Here, because PRx is an MPP PRx, as described above, PRx can set the 'Ext' bit of the ID to 1 and transmit the ID to the wireless power transmitter. Afterwards, the wireless power receiver can transmit the XID in which B0 has 0xFE to the wireless power transmitter. At this time, the 'Preferred frequency' included in the XID can be set to the second operating frequency (e.g. 360 kHz) as described above.

The MPP wireless power receiver selects whether to operate in MPP baseline (MPP restricted mode) or MPP full (MPP full mode). At this time, as explained earlier, there is a large difference in operation between the MPP baseline operation and the MPP full operation, below, the configuration proposed in this specification will be described separately in the case of MPP baseline operation and MPP full operation.

Case 3-1 (for MPP Baseline)

Figure 26:
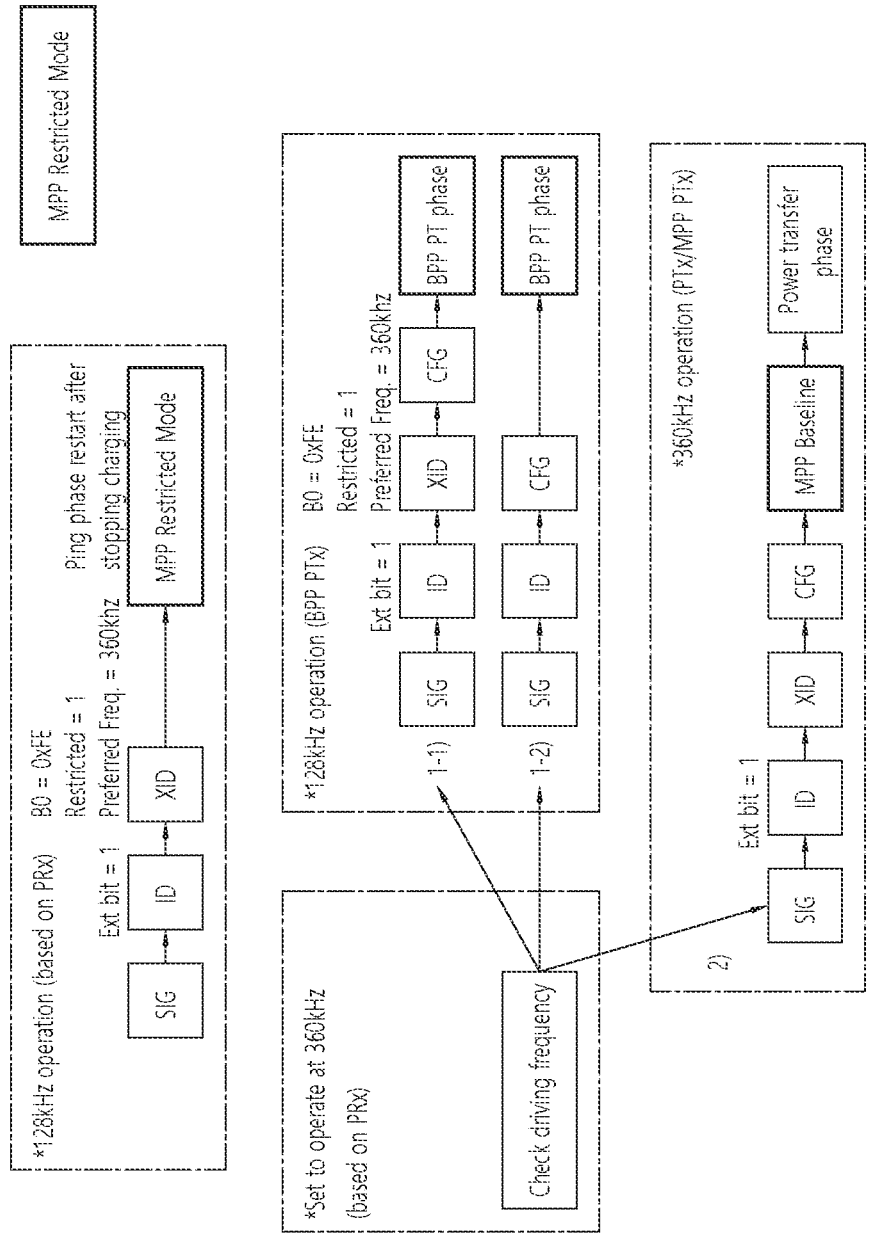
FIG. 26 schematically shows the protocol when the wireless power receiver wishes to operate in MPP restricted mode.

FIG. 26 schematically shows the protocol when the wireless power receiver wishes to operate in MPP restricted mode.

According to FIG. 26, in the case of MPP restricted mode, that is, MPP-Baseline, as described above, the wireless power receiver transmits SIG. ID, and XID packets to the wireless power transmitter at the first operating frequency. At this time, as described above, the wireless power receiver sets 'Restricted mode' in the XID packet to 1.

And after transmitting the XID packet, the wireless power receiver immediately ends charging. This may mean that the wireless power receiver attempting to enter MPP restricted mode does not transmit CFG packets to the wireless power transmitter.

Afterwards, PRx switches to MPP Restricted mode and switches to MPP baseline profile (driving frequency is 360 kHz).

At this time, the BPP wireless power transmitter cannot change the operating frequency even if wireless charging is terminated and the power transfer protocol is restarted. This is because the BPP wireless power transmitter can perform communication only at the first operating frequency. In other words, BPP PTx proceeds with the power transfer protocol back to BPP (on the first operating frequency).

On the other hand, unlike the BPP wireless power transmitter, the MPP wireless power transmitter can switch to the MPP baseline profile based on confirmation that the wireless power receiver operates in MPP restricted mode through the XID packet as above. That is, the MPP wireless power transmitter can switch the operating frequency to the second operating frequency (e.g., 360 kHz).

Considering this background, hereinafter, the previously proposed wireless power receiver checks the operating frequency of the wireless power transmitter, based on this, the configuration for identifying whether the wireless power transmitter is a BPP wireless power transmitter or an MPP wireless power transmitter will be described. Also, at this time, the protocol between the wireless power receiver and the wireless power transmitter according to the identification result will be described in detail.

1) PRx checks the driving frequency of PTx and determines whether PTx is MPP/BPP based on this. That is, the wireless power receiver determines whether the driving frequency is the second operating frequency (360 kHz). If the operating frequency is not the second operating frequency (360 kHz), the wireless power receiver may regard the wireless power transmitter as BPP(/EPP) PTx.

In other words, PRx will operate if the driving frequency of the wireless power transmitter is not 360 kHz, operations can be performed with BPP/EPP PRx rather than MPP PRx (SS-ID-XID/Optional-CFG- . . . ; that is, proceed according to the existing WPC standard). Here, since the wireless power receiver performs BPP/EPP PRx operation rather than MPP PRx operation. MPP's ID/XID format may not be used. When a wireless power receiver supporting MPP operates as BPP/EPP PRx, a response to CFG cannot be received because the wireless power transmitter is a BPP wireless power transmitter. Accordingly, the wireless power receiver supporting MPP automatically operates as BPP PRx.

1-1) At this time, the wireless power receiver can transmit SS (SIG), ID, XID, and CFG to the wireless power transmitter. And, based on the wireless power receiver not receiving a response (e.g., ACK) to the CFG transmitted by itself from the wireless power transmitter, it can receive wireless power based on BPP from a wireless power transmitter.

1-2) Meanwhile, in 1-1, an example in which a wireless power receiver transmits an XID packet to a wireless power transmitter is described. At this time, the reason why the MPP wireless power receiver transmitted the XID packet is to inform the wireless power transmitter that it is an MPP wireless power receiver (and/or whether it uses MPP restricted mode).

However, through confirmation of the driving frequency, the wireless power receiver already knows that the wireless power transmitter does not support MPP operation. In this situation, transmitting an XID packet from the wireless power receiver to the wireless power transmitter may be a waste of resources. Accordingly, as in 1-2, the wireless power receiver may not transmit the XID packet to the wireless power transmitter.

That is, the wireless power receiver can transmit SS (SIG). ID, and CFG to the wireless power transmitter. And, based on the wireless power receiver not receiving a response (e.g., ACK) to the CFG transmitted by itself from the wireless power transmitter, it can receive wireless power based on BPP from a wireless power transmitter.

2) PRx checks the driving frequency of PTx and determines whether PTx is MPP/BPP based on this. That is, the wireless power receiver determines whether the driving frequency is the second operating frequency (360 kHz). When the operating frequency is the second operating frequency (360 kHz), the wireless power receiver can regard the wireless power transmitter as MPP PTx.

At this time, as described above, because the wireless power receiver notifies the wireless power transmitter that it is in MPP restricted mode, the wireless power receiver runs the MPP-baseline profile on the second driving frequency. In order to proceed with the MPP baseline profile, the wireless power receiver may transmit SIG, ID, XID, CFG packets, etc. to the wireless power transmitter on the second driving frequency, thereafter, the wireless power receiver can receive wireless power from the wireless power transmitter based on the MPP baseline. Specific examples of protocols based on the MPP baseline are as described above.

Case 3-2 (for MPP Full)

Figure 27:
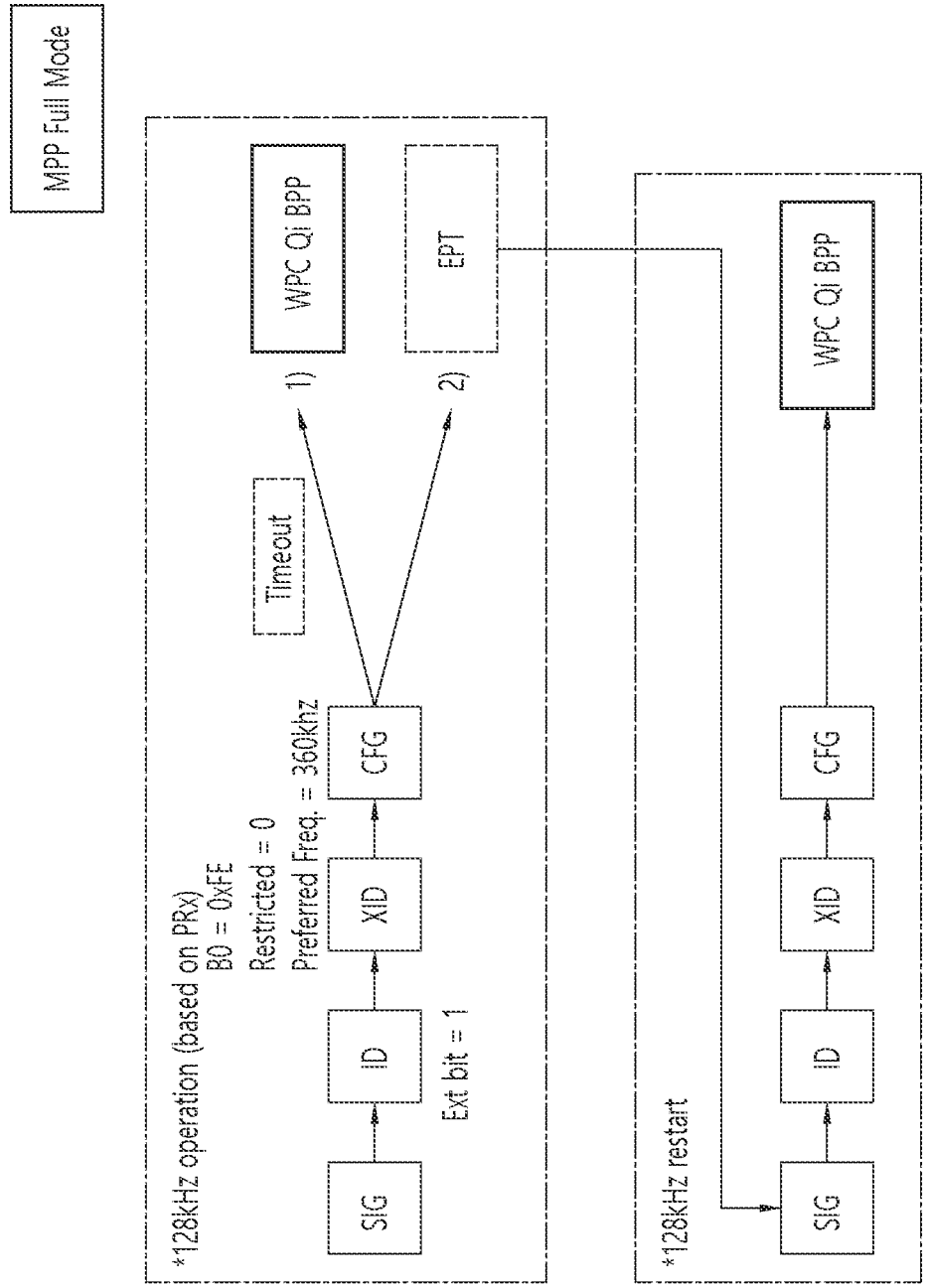
FIG. 27 schematically shows the protocol when the wireless power receiver wishes to operate in MPP full mode.

FIG. 27 schematically shows the protocol when the wireless power receiver wishes to operate in MPP full mode.

According to FIG. 27, when the MPP wireless power receiver wishes to perform an MPP full operation, it can transmit SIG, ID, XID, and CFG packets to the wireless power transmitter, as described above. In addition, the XID at this time includes information (B0) indicating that the wireless power receiver intends to perform an MPP operation, by setting 'restricted' in XID to 0, it can be indicated that the wireless power receiver wants to perform MPP full operation.

Meanwhile, the MPP wireless power receiver that wishes to perform MPP full operation transmits CFG packets to the wireless power transmitter differently from the MPP restricted mode.

1) At this time, when PTx is a BPP wireless power transmitter as in this case, since the wireless power transmitter performs BPP operation, it does not respond to the CFG packet it received.

At this point, the point where the PTx has not responded to the CFG, the wireless power receiver can detect that the wireless power transmitter is a BPP wireless power receiver. In other words, the wireless power receiver may consider the wireless power transmitter to be a BPP PTx based on not receiving a response to the CFG from the wireless power transmitter until a timeout occurs. If the wireless power transmitter is a BPP PTx, the wireless power receiver and/or wireless power transmitter may enter the power transfer phase and proceed with charging based on the non-response of the CFG.

2) Alternatively, the wireless power receiver may restart the protocol for wireless power transfer between the wireless power receiver and/or the wireless power transmitter by transmitting the EPT to the wireless power transmitter. At this time, after performing a restart, the wireless power transmitter and wireless power receiver can perform operations based on WPC Qi BPP.

Meanwhile, in addition to the configuration in which the wireless power receiver identifies the BPP wireless power transmitter according to the above CFG, etc., a wireless power receiver that wishes to perform MPP full operation can identify whether the wireless power transmitter is BPP by identifying the operating frequency of the wireless power transmitter, as described above. The specific details of this are as described above.

2. Perspective on EPP Wireless Power Transmitter

The profile of the wireless power receiver capable of operating with the EPP wireless power transmitter can be described in the table as follows.

TABLE 3

| Case | PTx's Profile | PRx's Profile | Details |
|---|---|---|---|
| #4 | EPP | BPP | No problem |
| #5 | EPP | EPP | No problem |
| #6 | EPP | MPP | Unable to check whether PRx is MPP PTx or not. |

(4) Case 4

In the case of EPP PTx and BPP PRx, since the PRx is BPP, the wireless power receiver informs PTx that it is a BPP PRx in the CFG Packet. Because of this, PTx can switch (or operate) to the BPP Profile.

(5) Case 5

In the case of EPP PTx and EPP PRx, since the power profile is the same between the PTx and PRx, there is no need to switch profiles. That is, an EPP operation is performed between the wireless power transmitter and the wireless power receiver.

(6) Case 6

This specification seeks to provide specific protocols for the cases of EPP PTx and MPP PRx. For that reason, as explained above, a protocol is provided between BPP and EPP to support mutual identification, however, since there is currently no or insufficient protocol between EPP and MPP to support mutual identification, problems may arise in wireless power transfer between the wireless power transmitter and wireless power receiver.

Here, because PRx is an MPP PRx, as described above, PRx can set the 'Ext' bit of the ID to 1 and transmit the ID to the wireless power transmitter. Afterwards, the wireless power receiver can transmit the XID in which B0 has 0xFE to the wireless power transmitter. At this time, the 'Preferred frequency' included in the XID can be set to the second operating frequency (e.g. 360 kHz) as described above.

The MPP wireless power receiver selects whether to operate in MPP baseline (MPP restricted mode) or MPP full (MPP full mode). At this time, as explained earlier, there is a large difference in operation between the MPP baseline operation and the MPP full operation, below, the configuration proposed in this specification will be described separately for the case of MPP baseline operation and MPP full operation.

Case 6-1 (for MPP Baseline)

Prior to a detailed description of Case 6-1, a wireless power transmitter supporting EPP may perform BPP operation in some cases. At this time, when a wireless power transmitter supporting EPP performs a BPP operation, the operation in Case 3-1 above can be applied. The specific details of this are as described above.

Figure 28:
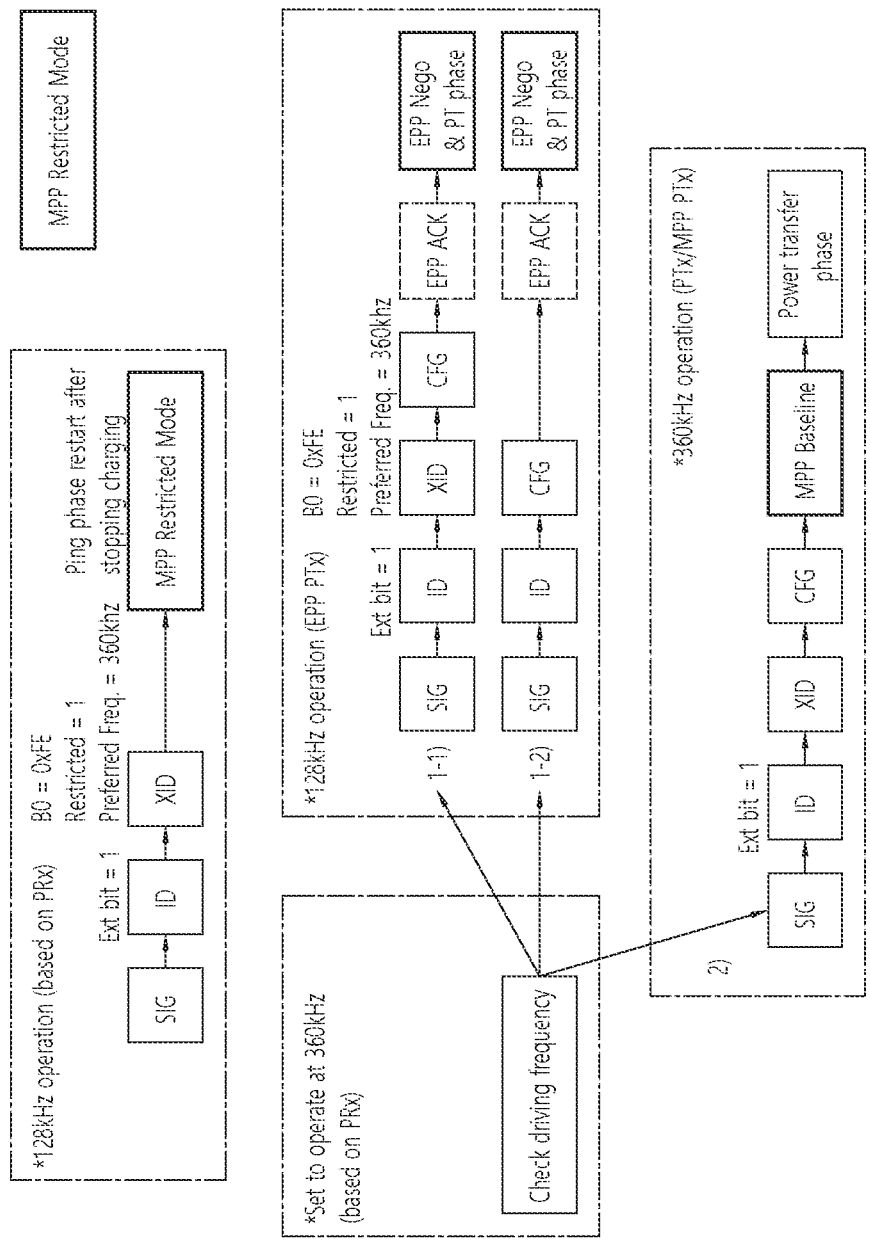
FIG. 28 schematically shows the protocol when the wireless power receiver wishes to operate in MPP restricted mode.

FIG. 28 schematically shows the protocol when the wireless power receiver wishes to operate in MPP restricted mode.

According to FIG. 28, in the case of MPP restricted mode, that is, MPP-Baseline, the wireless power receiver transmits SIG, ID, and XID packets to the wireless power transmitter at the first operating frequency, as described above. At this time, as described above, the wireless power receiver sets 'Restricted mode' in the XID packet to 1.

And after transmitting the XID packet, the wireless power receiver immediately ends charging. This may mean that the wireless power receiver attempting to enter MPP restricted mode does not transmit CFG packets to the wireless power transmitter.

Afterwards, PRx switches to MPP Restricted mode and switches to MPP baseline profile (driving frequency is 360 kHz).

At this time, the EPP wireless power transmitter cannot change the operating frequency even if wireless charging is terminated and the power transfer protocol is restarted. This is because the EPP wireless power transmitter can perform communication only at the first operating frequency. In other words, the EPP PTx proceeds with the power transfer protocol back to the EPP (on the first operating frequency).

On the other hand, unlike the EPP wireless power transmitter, the MPP wireless power transmitter can switch to the MPP baseline profile based on confirmation that the wireless power receiver operates in MPP restricted mode through the XID packet as above. That is, the MPP wireless power transmitter can switch the operating frequency to the second operating frequency (e.g., 360 kHz).

Considering this background, below, as previously proposed, the wireless power receiver checks the operating frequency of the wireless power transmitter, based on this, the configuration for identifying whether the wireless power transmitter is an EPP wireless power transmitter or an MPP wireless power transmitter will be described. Also, at this time, the protocol between the wireless power receiver and the wireless power transmitter according to the identification result will be described in detail.

1) PRx checks the driving frequency of PTx and determines whether PTx is MPP/EPP based on this. That is, the wireless power receiver determines whether the driving frequency is the second operating frequency (360 kHz). If the operating frequency is not the second operating frequency (360 kHz), the wireless power receiver may regard the wireless power transmitter as EPP(/BPP) PTx.

In other words, if the driving frequency of the wireless power transmitter is not 360 kHz. PRx can perform operations as EPP/BPP PRx rather than MPP PRx (SS-ID-XID/Optional-CFG- . . . ; that is, proceed according to the existing WPC standard). Here, because the wireless power receiver performs an EPP/BPP PRx operation rather than an MPP PRx operation, the MPP ID/XID format may not be used. When the wireless power receiver operates as an EPP PRx, a response to CFG can be received if the wireless power transmitter is an EPP wireless power transmitter, at this time, the wireless power receiver performs the EPP operation. Meanwhile, when the wireless power receiver operates as a BPP wireless power receiver, a response to CFG cannot be received even if the wireless power transmitter is an EPP wireless power transmitter. Accordingly, the wireless power receiver automatically operates as BPP PRx.

1-1) At this time, the wireless power receiver can transmit SS (SIG), ID, XID, and CFG (At this time, the 'neg' bit is set to 1, so negotiation can be indicated) to the wireless power transmitter. And, based on the wireless power receiver receiving a response (e.g., ACK) to the CFG it transmitted from the wireless power transmitter, negotiation according to EPP can be performed with a wireless power transmitter. Thereafter, the wireless power receiver may receive wireless power from the wireless power transmitter based on EPP.

1-2) Meanwhile, in 1-1, an example in which a wireless power receiver transmits an XID packet to a wireless power transmitter is described. At this time, the reason why the MPP wireless power receiver transmitted the XID packet is to inform the wireless power transmitter that it is an MPP wireless power receiver (and/or whether it uses MPP restricted mode).

However, through confirmation of the driving frequency, the wireless power receiver already knows that the wireless power transmitter does not support MPP operation. In this situation, transmitting an XID packet from the wireless power receiver to the wireless power transmitter may be a waste of resources. Accordingly, as in 1-2, the wireless power receiver may not transmit the XID packet to the wireless power transmitter.

That is, the wireless power receiver can transmit SS (SIG), ID, and CFG (at this time, the 'neg' bit is set to 1, thereby indicating that negotiation is performed) to the wireless power transmitter. And, based on the wireless power receiver receiving a response (e.g., ACK) to the CFG it transmitted from the wireless power transmitter, negotiation according to EPP can be performed with a wireless power transmitter. Thereafter, the wireless power receiver may receive wireless power from the wireless power transmitter based on EPP.

2) PRx checks the driving frequency of PTx and determines whether PTx is MPP/EPP based on this. That is, the wireless power receiver determines whether the driving frequency is the second operating frequency (360 kHz). When the operating frequency is the second operating frequency (360 kHz), the wireless power receiver can regard the wireless power transmitter as MPP PTx.

At this time, as described above, the wireless power receiver notified the wireless power transmitter that it was in MPP restricted mode, the wireless power receiver runs the MPP-baseline profile on the second driving frequency. In order to proceed with the MPP baseline profile, the wireless power receiver may transmit SIG, ID, XID, CFG packets, etc. to the wireless power transmitter on the second driving frequency, thereafter, the wireless power receiver can receive wireless power from the wireless power transmitter based on the MPP baseline. Specific examples of protocols based on the MPP baseline are as described above.

Case 6-2 (for MPP full)

Prior to a detailed description of Case 6-2, a wireless power transmitter supporting EPP may perform BPP operation in some cases. At this time, when a wireless power transmitter supporting EPP performs a BPP operation, the operation in Case 3-2 above can be applied. The specific details of this are as described above.

Figure 29:
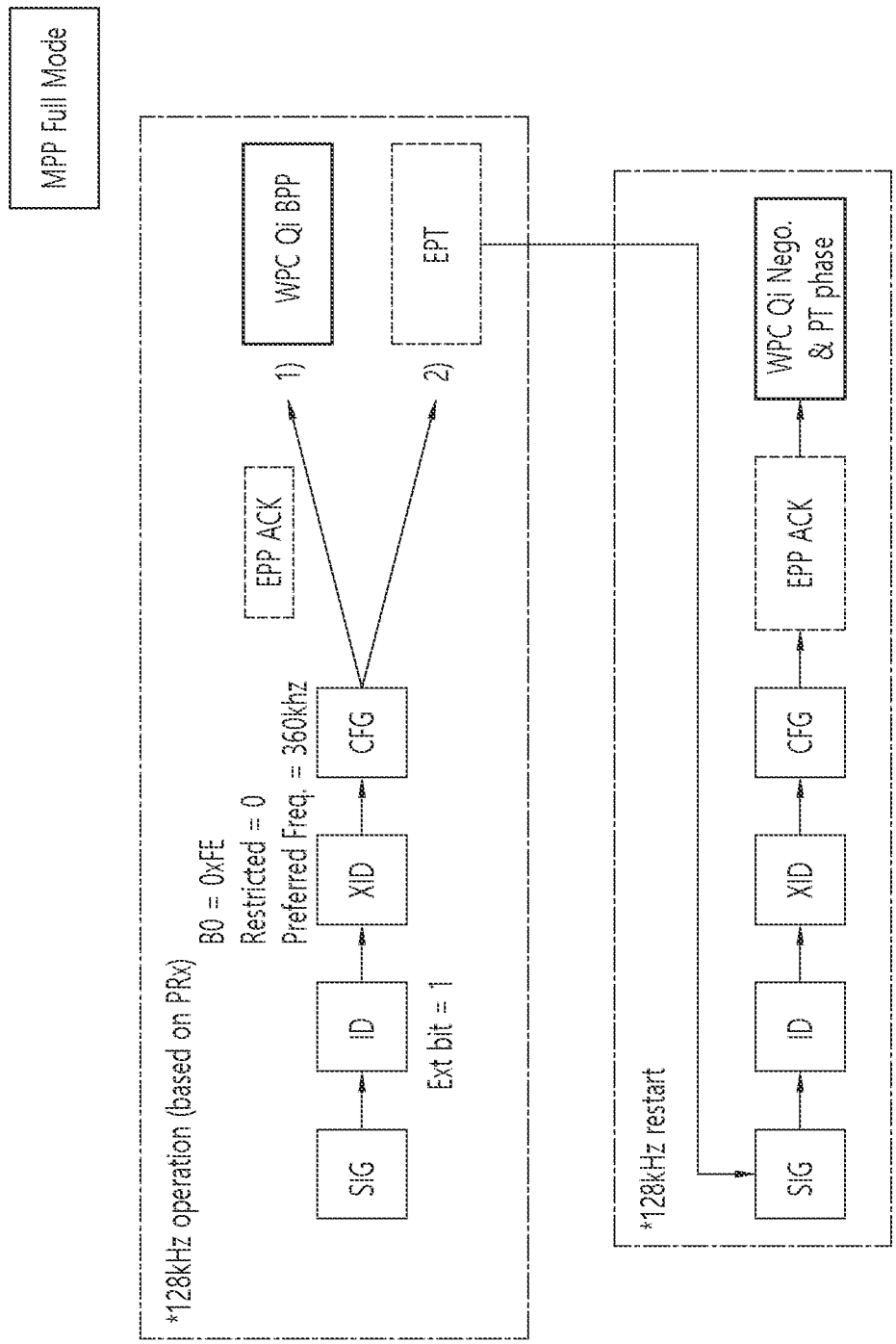
FIG. 29 schematically shows the protocol when the wireless power receiver wishes to operate in MPP full mode.

FIG. 29 schematically shows the protocol when the wireless power receiver wishes to operate in MPP full mode.

According to FIG. 29, when the MPP wireless power receiver wants to perform the operation of MPP full, as described above, SIG, ID, XID, and CFG packets can be transmitted to the wireless power transmitter. In addition, the XID at this time includes information (B0) indicating that the wireless power receiver intends to perform an MPP operation, by setting 'restricted' in XID to 0, it can be indicated that the wireless power receiver wants to perform MPP full operation.

Meanwhile, the MPP wireless power receiver that wishes to perform MPP full operation transmits CFG packets to the wireless power transmitter differently from the MPP restricted mode.

1) At this time, if PTx is an EPP wireless power transmitter as in this case, because the wireless power transmitter performs the EPP operation, it can perform an ACK response to the CFG packet it receives. And the ACK at this time corresponds to EPP ACK.

At this point, the point where PTx has transmitted the EPP ACK, the wireless power receiver can detect that the wireless power transmitter is an EPP wireless power receiver. If the wireless power transmitter is an EPP PTx, the wireless power receiver (supporting EPP as well as MPP) and/or the wireless power transmitter may perform WPC Qi EPP operation. In other words, after negotiations based on EPP are conducted in the negotiation phase, the power transfer phase can be entered and charging can proceed.

2) Alternatively, the wireless power receiver may restart the protocol for wireless power transfer between the wireless power receiver and/or the wireless power transmitter by transmitting the EPT to the wireless power transmitter. At this time, after performing a restart, the wireless power transmitter and wireless power receiver can perform operations based on WPC Qi EPP.

Meanwhile, in addition to the configuration in which the wireless power receiver identifies the EPP wireless power transmitter according to the EPP ACK response to the above CFG, a wireless power receiver that wishes to perform MPP full operation can identify whether the wireless power transmitter is EPP(/BPP) by identifying the operating frequency of the wireless power transmitter, as described above. The specific details of this are as described above.

3. Perspective on MPP Wireless Power Transmitter

The profile of the wireless power receiver capable of operating with the MPP wireless power transmitter can be described in the table as follows.

TABLE 4

| Case | PTx's Profile | PRx's Profile | Details |
|---|---|---|---|
| #7 | MPP | BPP | No problem |
| #8 | MPP | EPP | No problem |
| #9 | MPP | MPP | No problem |

(1) Case 7

For MPP PTx and BPP PRx, the PRx does not send an XID with or without MPP support, (because the wireless power receiver sets the 'neg' field in CFG to 0, indicating that the wireless power receiver performs a BPP operation), PTx can know that the wireless power receiver is BPP. Accordingly, both the wireless power transmitter and the wireless power receiver can perform BPP operation.

(2) Case 8

For MPP PTx and EPP PRx, the PRx does not send an XID with or without MPP support, the 'Neg' bit in the CFG packet can be set to 1 to indicate that the wireless power receiver is performing an EPP operation. Accordingly, PTx can know that the wireless power receiver is EPP. Accordingly, both PRx and PTx can perform BPP operation (if the wireless power transmitter supports only BPP/MPP).

(3) Case 9

In the case of MPP PTx and MPP PRx, there is no need for profile switching since the power profile is the same between the PTx and PRx.

So far, the embodiments of this specification have been described in detail. If the specification is summarized previously, it can be organized as follows.

In this specification, PRx can inform PTx whether it supports BPP/EPP/MPP. Here, PTx can check whether the wireless power receiver wants BPP with the neg bit of CFG sent by PRx. The wireless power transmitter can check whether the wireless power receiver wants EPP with the Neg bit of CFG sent by PRx. The wireless power transmitter can check the ID/XID to see whether the wireless power receiver wants MPP, and check whether the wireless power receiver is an MPP wireless power receiver and/or whether it is an MPP-Baseline/Full wireless power receiver.

In this situation, it is impossible for PRx to check whether PTx supports BPP/EPP/MPP.

Therefore, in this specification, the highest protocol level supported by PTx is confirmed based on the highest protocol level supported by the PRx device, the wireless power transmitter and wireless power receiver provide a configuration that operates at the highest protocol level that they commonly support. Here, PRx may not raise the operating protocol level before checking the highest protocol level supported by PTx.

In the case of BPP PTx (no problem in case of BPP/EPP PRx), MPP PRx assumes MPP PTx operation (check B0 in XID packet, presence of 0xFE and presence of 360 kHz operation), it checks whether MPP is supported, it assumes the presence or absence of EPP PTx support, and operates as BPP when not in operation or not supported.

In the case of BPP PTx (no problem in the case of BPP/EPP PRx), MPP PRx assumes MPP PTx operation and checks whether MPP is supported, when not operating or not supported, it operates as BPP.

In the case of EPP PTx (no problem in the case of BPP/EPP PRx), MPP PRx assumes MPP PTx operation and checks whether MPP is supported, if not supported, operates as EPP. If EPP is not supported, it operates as BPP.

In the case of EPP PTx (no problem in case of BPP/EPP PRx), MPP PRx assumes MPP PTx operation, checks whether MPP is supported, and operates as BPP if not supported.

Hereinafter, with respect to the embodiments of the present specification described above, an example of a case where the wireless power receiver does not detect a change in the operating frequency and an example of a case where the wireless power receiver detects a change in the operating frequency will be explained through a flowchart.

Figure 30:
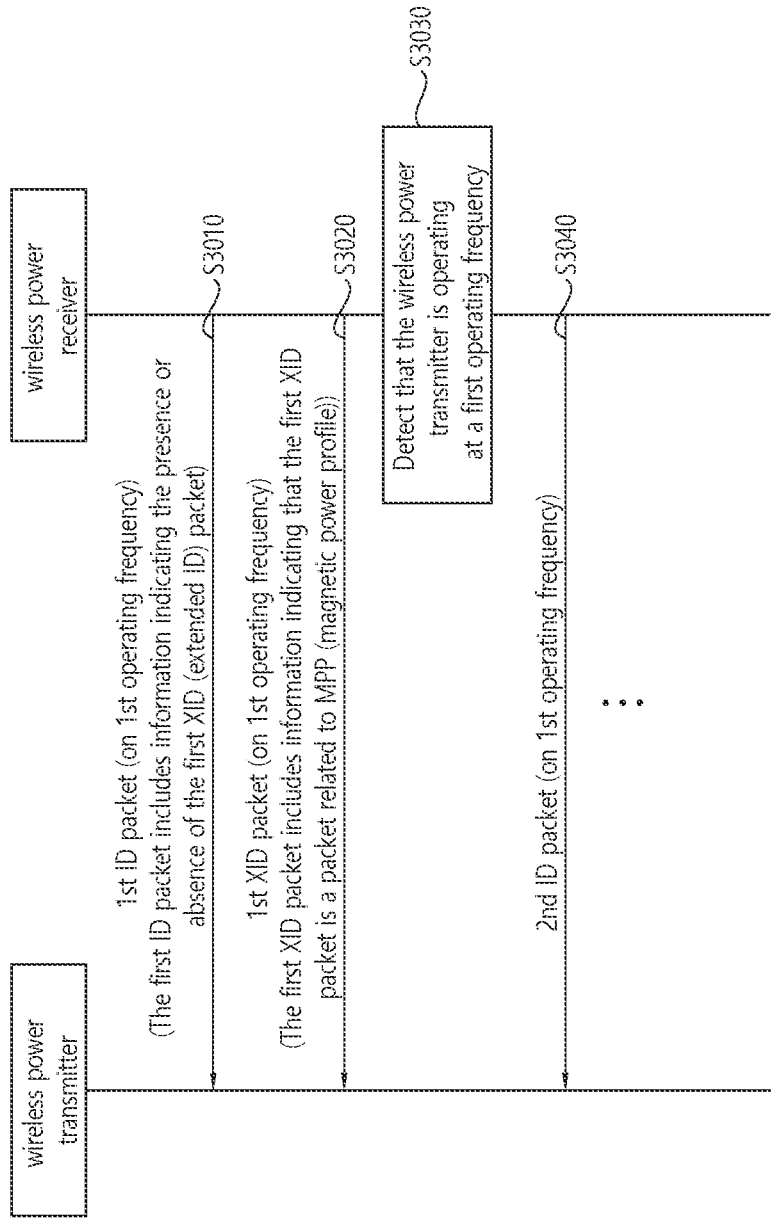
FIG. 30 is a flowchart for an example when the wireless power receiver does not detect a change in the operating frequency.

FIG. 30 is a flowchart for an example when the wireless power receiver does not detect a change in the operating frequency.

According to FIG. 30, a wireless power receiver that wishes to perform an MPP operation may transmit a first ID packet to the wireless power transmitter (on first operating frequency) (S3010). Here, the first ID packet may include information indicating the presence or absence of a first extended ID (XID) packet.

The wireless power receiver may transmit the first XID packet to the wireless power transmitter (on first operating frequency) (S3020). Here, the first XID packet may include information indicating that the first XID packet is a packet related to a magnetic power profile (MPP).

The wireless power receiver may detect that the wireless power transmitter is operating at the first operating frequency (S3030).

Thereafter, the wireless power receiver may transmit the second ID packet to the wireless power transmitter (on the first operating frequency) (S3040).

Specific examples of this example are as described above.

Figure 31:
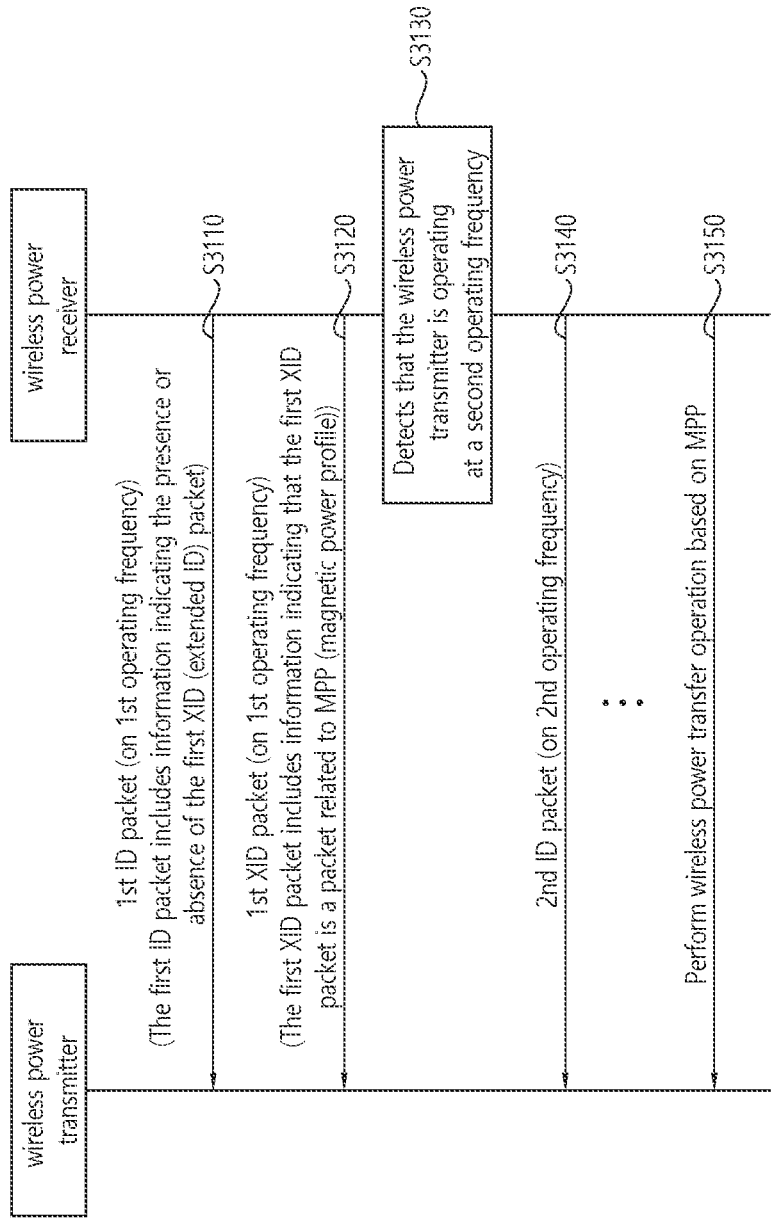
FIG. 31 is a flowchart for an example when the wireless power receiver detects a change in operating frequency.

FIG. 31 is a flowchart for an example when the wireless power receiver detects a change in operating frequency.

According to FIG. 31, the wireless power receiver that wishes to perform the MPP operation may transmit the first ID packet to the wireless power transmitter (on the first operating frequency) (S3110). Here, the first ID packet may include information indicating the presence or absence of a first extended ID (XID) packet.

The wireless power receiver may transmit the first XID packet to the wireless power transmitter (on first operating frequency) (S3120). Here, the first XID packet may include information indicating that the first XID packet is a packet related to a magnetic power profile (MPP).

The wireless power receiver may detect that the wireless power transmitter is operating at the second operating frequency (S3130).

Thereafter, the wireless power receiver may transmit the second ID packet to the wireless power transmitter (on second operating frequency) (S3140).

And, the wireless power receiver can perform a wireless power transfer operation based on MPP (S3150).

Specific examples of this example are as described above.

Hereinafter, embodiments of the present specification will be described again from the viewpoint of various subjects.

The following drawings were prepared to explain a specific example of the present specification. Since the names of specific devices or specific signals/messages/fields described in the drawings are provided as examples, the technical features of this specification are not limited to the specific names used in the drawings below.

Figure 32:
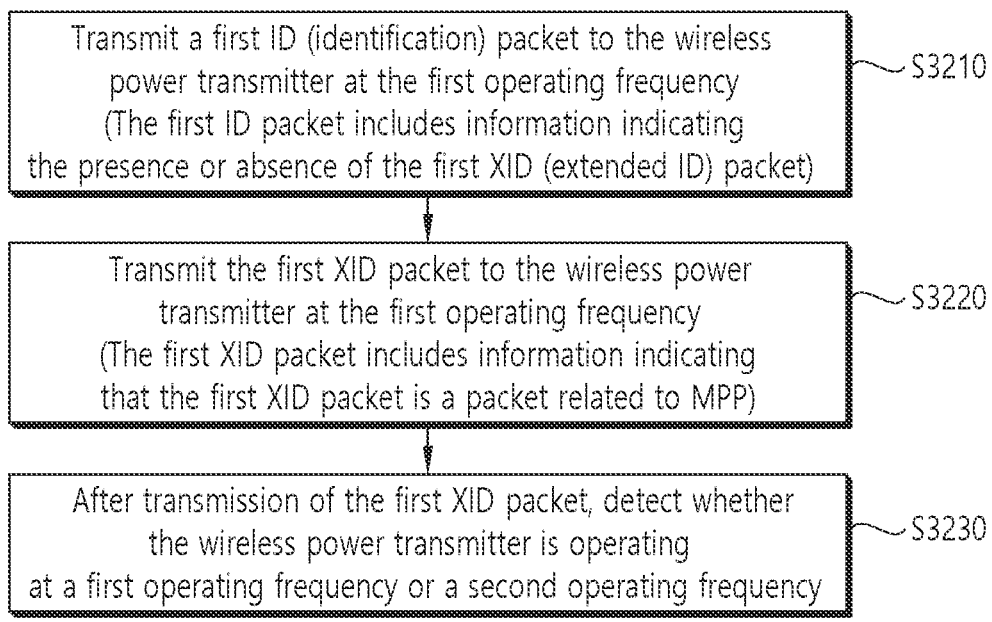
FIG. 32 is a flowchart of a method of receiving wireless power performed by a wireless power receiver, according to an embodiment of the present specification.

FIG. 32 is a flowchart of a method of receiving wireless power performed by a wireless power receiver, according to an embodiment of the present specification.

According to FIG. 32, the wireless power receiver may transmit a first ID (identification) packet to the wireless power transmitter at the first operating frequency (S3210). Here, the first ID packet may include information indicating the presence or absence of a first extended ID (XID) packet.

The wireless power receiver may transmit the first XID packet to the wireless power transmitter at the first operating frequency (S3220). Here, the first XID packet may include information indicating that the first XID packet is a packet related to the MPP.

After transmitting the first XID packet, the wireless power receiver may detect whether the wireless power transmitter is operating at the first operating frequency or the second operating frequency (S3230).

For example, based on detecting that the wireless power transmitter is operating at the first operating frequency, the wireless power receiver may detect that the wireless power transmitter performs an operation based on a baseline power profile (BPP) or extended power profile (EPP). In addition, after the detection, the wireless power receiver may transmit a second ID packet on the first operating frequency.

Or, for example, based on detecting that the wireless power transmitter is operating at the second operating frequency, the wireless power receiver may detect that the wireless power transmitter is a wireless power transmitter that performs an operation based on the MPP. Here, the wireless power receiver may receive the wireless power from the wireless power transmitter based on the MPP on the second operating frequency. In addition, after the detection, the wireless power receiver may transmit a second ID packet and a second XID packet on the second operating frequency.

The wireless power receiver may change the operating frequency from the first operating frequency to the second operating frequency after transmitting the first XID packet. The first operating frequency may be different from the second operating frequency. For example, the first operating frequency may have a value between 100 kHz and 145 kHz, and the second operating frequency may have a value of 360 kHz.

Meanwhile, the wireless power receiver may transmit information informing the wireless power transmitter of the second operating frequency. Here, information indicating the second operating frequency may be included in the first XID packet.

Additionally, the first XID packet may include information indicating that the wireless power receiver operates in a restricted MPP mode.

Although not separately shown, this specification may provide a wireless power receiver supporting a magnetic power profile (MPP). A wireless power receiver may include a power pickup associated with receiving wireless power from a wireless power transmitter and a communication/controller associated with communicating with the wireless power transmitter and controlling the reception of the wireless power. The wireless power receiver may be a wireless power receiver for transmitting a first ID (identification) packet to the wireless power transmitter at a first operating frequency, where the first ID packet includes information indicating the presence or absence of a first extended ID (XID) packet, transmit the first XID packet to the wireless power transmitter at the first operating frequency, where the first XID packet includes information indicating that the first XID packet is a packet related to the MPP, and after transmission of the first XID packet, detecting whether the wireless power transmitter is operating at the first operating frequency or the second operating frequency.

Figure 33:
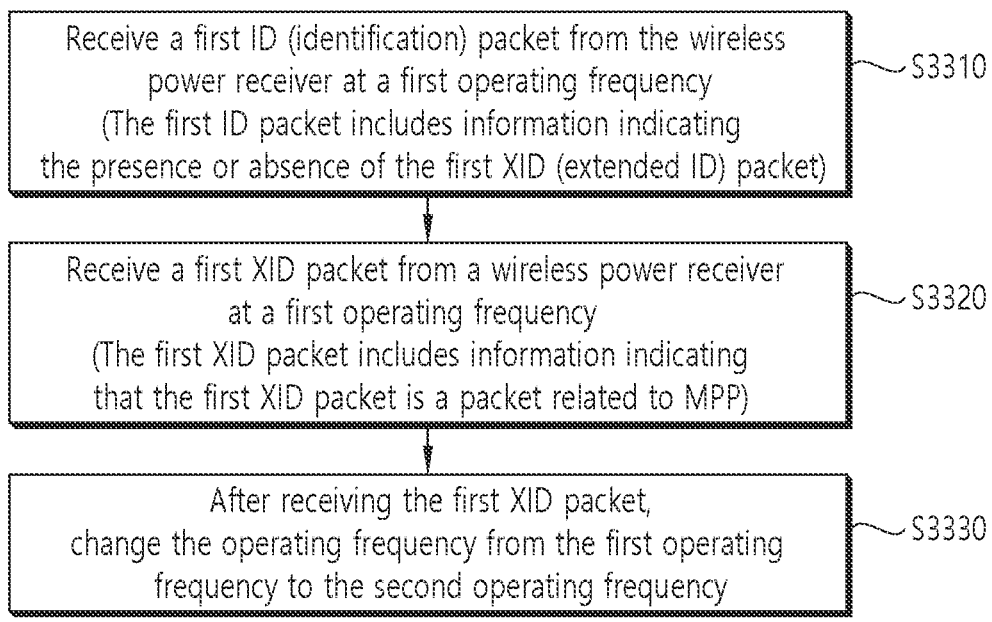
FIG. 33 is a flowchart of a method for transmitting wireless power performed by a wireless power transmitter according to an embodiment of the present specification.

FIG. 33 is a flowchart of a method for transmitting wireless power performed by a wireless power transmitter according to an embodiment of the present specification.

According to FIG. 33, the wireless power transmitter may receive a first ID (identification) packet from the wireless power receiver at the first operating frequency (S3310). The first ID packet may include information indicating the presence or absence of a first extended ID (XID) packet.

The wireless power transmitter may receive the first XID packet from the wireless power receiver at the first operating frequency (S3320). The first XID packet may include information indicating that the first XID packet is a packet related to a magnetic power profile (MPP).

After receiving the first XID packet, the wireless power transmitter may change the operating frequency from the first operating frequency to the second operating frequency (S3330).

Although not separately shown, this specification may provide a wireless power transmitter supporting a magnetic power profile (MPP). A wireless power transmitter may include a power converter associated with transmitting wireless power to a wireless power receiver and a communicator/controller associated with communicating with the wireless power receiver and controlling the transmission of the wireless power. The wireless power transmitter may be a wireless power transmitter for receiving a first ID (identification) packet from the wireless power receiver at a first operating frequency, where the first ID packet includes information indicating the presence or absence of a first extended ID (XID) packet, receiving the first XID packet from the wireless power receiver at the first operating frequency, where the first XID packet includes information indicating that the first XID packet is a packet related to a magnetic power profile (MPP), and after receiving the first XID packet, performing a change in operating frequency from the first operating frequency to the second operating frequency.

Hereinafter, the effects of this specification will be described.

To explain the effect of the specification, the previous problem is explained again as follows. Since BPP/EPP was developed with some consideration for mutual compatibility between the BPP wireless power transmitter/wireless power receiver and the EPP wireless power transmitter/wireless power receiver, no major compatibility problems occurred.

However, MPP, which is different from the above BPP/EPP, does not use all of the protocols of BPP/EPP, so MPP may have compatibility issues with BPP/EPP. In particular, since the market dominance of wireless power transmitters and/or wireless power receivers using the MPP standard is not low, problems with compatibility between BPP/EPP and MPP may be maximized according to the prior art.

As an example, in the conventional case, if the wireless power receiver wants to operate in MPP restricted mode, after the wireless power receiver transmits an XID packet at a first operating frequency (e.g., which the wireless power transmitter cannot identify), the power signal is immediately removed without transmitting CFG packets.

In this situation, the wireless power transmitter (which cannot identify the XID packet related to MPP) cannot interpret the XID packet it receives, it is not known that the wireless power receiver performs MPP-related operations. Even during this time, the wireless power transmitter does not receive CFG packets from the wireless power receiver either, the ping phase is restarted at the first operating frequency (e.g., based on a timeout, etc.).

Meanwhile, a wireless power receiver that wishes to operate in MPP restricted mode performs frequency conversion to a second operating frequency for MPP restricted mode, and then performs a wireless power protocol on the second operating frequency.

However, as previously explained, the wireless power transmitter still operates at the first operating frequency, a problem occurs in which power transfer is impossible between a wireless power transmitter operating at a first operating frequency and a wireless power receiver operating at a second operating frequency.

To solve the above problems, this specification provides a configuration in which the MPP wireless power receiver can identify whether the wireless power transmitter is a BPP/EPP wireless power transmitter or an MPP wireless power transmitter by only checking the operating frequency of the wireless power transmitter.

That is, according to the present specification, a wireless power receiver that wishes to perform an MPP operation does not immediately perform a wireless power transfer-related protocol on the second operating frequency, it can confirm the operating frequency of the wireless power transmitter. Through this, the wireless power receiver that wishes to perform an MPP operation does not perform a frequency shift to the second operating frequency when the wireless power transmitter performs a BPP/EPP operation, BPP or EPP operation is performed on the first operating frequency.

Accordingly, the problem described above, which arises due to omission of mutual communication, the operating frequency at which the wireless power transmitter operates and the operating frequency at which the wireless power receiver operates are different, preventing the problem of not being able to perform mutual power transfer protocols. Accordingly, the effect that stable power transfer can be achieved even between a wireless power transmitter and a wireless power receiver that use different protocols.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for receiving a wireless power in a wireless power transfer system, the method performed by a wireless power receiver, which supports a magnetic power profile (MPP), and comprising:
    transmitting, to a wireless power transmitter, a first signal strength (SIG) packet at a first operating frequency;
    transmitting, to the wireless power transmitter, a first identification (ID) packet at the first operating frequency,
    wherein the first ID packet includes first 1-bit information related to a first extended ID (XID) packet;
    based on the first 1-bit information having a value of one (1), transmitting, to the wireless power transmitter, the first XID packet at the first operating frequency,
    wherein the first XID packet includes second 1-bit information related to whether the wireless power receiver chooses to operate in an MPP-restricted mode,
    wherein the wireless power receiver operates under the MPP-restricted mode at a second operating frequency without performing a negotiation with the wireless power transmitter;
    based on the second 1-bit information having a value of one (1), transmitting, to the wireless power transmitter, a second SIG packet at the second operating frequency;
    transmitting, to the wireless power transmitter, a second ID packet at the second operating frequency;
    transmitting, to the wireless power transmitter, a second XID packet at the second operating frequency;
    determining whether an active frequency is the second operating frequency; and
    based on the active frequency being the second operating frequency, proceeding to a power transfer phase related to the MPP-restricted mode.

2. The method of claim 1, wherein the first operating frequency is different from the second operating frequency.

3. The method of claim 2, wherein the first operating frequency has a value between 100 kHz and 145 kHz,
    wherein the second operating frequency has a value of 360 kHz.

4. The method of claim 1, further comprising:
    determining whether the wireless power receiver chooses to operate in the MPP-restricted mode,
    wherein the determining whether the active frequency is the second operating frequency is performed after determining whether wireless power receiver chooses to operate in the MPP-restricted mode.

5. The method of claim 1, further comprising:
based on the active frequency being the first operating frequency, proceeding to a power transfer phase related to a baseline power profile (BPP).

6. A wireless power receiver, which supports a magnetic power profile (MPP), comprising:
a power pickup related to receiving wireless power from a wireless power transmitter; and
a communication/controller related to communicating with the wireless power transmitter and controlling the reception of the wireless power,
wherein the wireless power receiver is configured for:
transmitting, to a wireless power transmitter, a first signal strength (SIG) packet at a first operating frequency;
transmitting, to the wireless power transmitter, a first identification (ID) packet at the first operating frequency,
wherein the first ID packet includes first 1-bit information related to a first extended ID (XID) packet;
based on the first 1-bit information having a value of one (1), transmitting, to the wireless power transmitter, the first XID packet at the first operating frequency, wherein the first XID packet includes second 1-bit information related to whether the wireless power receiver chooses to operate in an MPP-restricted mode,
wherein the wireless power receiver operates under the MPP-restricted mode at a second operating frequency without performing a negotiation with the wireless power transmitter;
based on the second 1-bit information having a value of one (1), transmitting, to the wireless power transmitter, a second SIG packet at the second operating frequency;
transmitting, to the wireless power transmitter, a second ID packet at the second operating frequency;
transmitting, to the wireless power transmitter, a second XID packet at the second operating frequency;
determining whether an active frequency is the second operating frequency; and
based on the active frequency being the second operating frequency, proceeding to a power transfer phase related to the MPP-restricted mode.

7. The wireless power receiver of claim 6, wherein the first operating frequency is different from the second operating frequency.

8. The wireless power receiver of claim 6, wherein the first operating frequency has a value between 100 kHz and 145 kHz, wherein the second operating frequency has a value of 360 kHz.

9. The wireless power receiver of claim 6, wherein the wireless power receiver is further configured for:
determining whether the wireless power receiver chooses to operate in the MPP-restricted mode,
wherein the determining whether the active frequency is the second operating frequency is performed after determining whether wireless power receiver chooses to operate in the MPP-restricted mode.

10. The wireless power receiver of claim 6, wherein the wireless power receiver is further configured for:
based on the active frequency being the first operating frequency, proceeding to a power transfer phase related to a baseline power profile (BPP).

11. At least one computer readable medium (CRM) storing instructions that, based on being executed by at least one processor in a wireless power receiver, perform operations comprising:
transmitting, to a wireless power transmitter, a first signal strength (SIG) packet at a first operating frequency;
transmitting, to the wireless power transmitter, a first identification (ID) packet at the first operating frequency,
wherein the first ID packet includes first 1-bit information related to a first extended ID (XID) packet;
based on the first 1-bit information having a value of one (1), transmitting, to the wireless power transmitter, the first XID packet at the first operating frequency,
wherein the first XID packet includes second 1-bit information related to whether the wireless power receiver chooses to operate in an MPP-restricted mode,
wherein the wireless power receiver operates under the MPP-restricted mode at a second operating frequency without performing a negotiation with the wireless power transmitter;
based on the second 1-bit information having a value of one (1), transmitting, to the wireless power transmitter, a second SIG packet at the second operating frequency;
transmitting, to the wireless power transmitter, a second ID packet at the second operating frequency;
transmitting, to the wireless power transmitter, a second XID packet at the second operating frequency;
determining whether an active frequency is the second operating frequency; and
based on the active frequency being the second operating frequency, proceeding to a power transfer phase related to the MPP-restricted mode.

12. The CRM of claim 11, wherein the first operating frequency is different from the second operating frequency.

13. The CRM of claim 11, wherein the first operating frequency has a value between 100 kHz and 145 kHz, wherein the second operating frequency has a value of 360 kHz.

14. The CRM of claim 11, wherein the at least one processor is further configured for:
determining whether the wireless power receiver chooses to operate in the MPP-restricted mode,
wherein the determining whether the active frequency is the second operating frequency is performed after determining whether wireless power receiver chooses to operate in the MPP-restricted mode.

15. The CRM of claim 11, wherein the at least one processor is further configured for
based on the active frequency being the first operating frequency, proceeding to a power transfer phase related to a baseline power profile (BPP).

* * * * *